US011874954B2

(12) United States Patent
Shoji

(10) Patent No.: US 11,874,954 B2
(45) Date of Patent: Jan. 16, 2024

(54) ELECTRONIC DATA MANAGEMENT DEVICE, ELECTRONIC DATA MANAGEMENT SYSTEM, AND NON-TRANSITORY COMPUTER-READABLE RECORDING MEDIUM

(71) Applicant: SCIENCE PARK CORPORATION, Kanagawa (JP)

(72) Inventor: Koichiro Shoji, Kanagawa (JP)

(73) Assignee: SCIENCE PARK CORPORATION, Kanagawa (JP)

( * ) Notice: Subject to any disclaimer, the term of this patent is extended or adjusted under 35 U.S.C. 154(b) by 343 days.

(21) Appl. No.: 17/421,722

(22) PCT Filed: Nov. 27, 2019

(86) PCT No.: PCT/JP2019/046306
§ 371 (c)(1),
(2) Date: Jul. 8, 2021

(87) PCT Pub. No.: WO2020/144961
PCT Pub. Date: Jul. 16, 2020

(65) Prior Publication Data
US 2022/0083697 A1 Mar. 17, 2022

(30) Foreign Application Priority Data
Jan. 9, 2019 (JP) ................ 2019-001541

(51) Int. Cl.
*G06F 21/78* (2013.01)
*G06F 21/31* (2013.01)
(Continued)

(52) U.S. Cl.
CPC .............. *G06F 21/78* (2013.01); *G06F 21/31* (2013.01); *G06F 21/604* (2013.01); *G06F 21/6218* (2013.01); *G06F 21/64* (2013.01)

(58) Field of Classification Search
CPC .... G06F 21/6218; G06F 21/604; G06F 21/60; G06F 21/602; G06F 21/62; G06F 21/45; G06F 21/50; G06F 21/57
See application file for complete search history.

(56) References Cited

U.S. PATENT DOCUMENTS

| 2005/0111664 A1 | 5/2005 | Ritz et al. |
| 2013/0080773 A1 | 3/2013 | Lu et al. |

(Continued)

FOREIGN PATENT DOCUMENTS

| JP | 2010072885 | 4/2010 |
| JP | 2010204750 | 9/2010 |

(Continued)

OTHER PUBLICATIONS

"Search Report of Europe Counterpart Application", dated Jan. 20, 2022, p. 1-p. 8.

(Continued)

*Primary Examiner* — Edward Zee
(74) *Attorney, Agent, or Firm* — JCIPRNET

(57) ABSTRACT

The present disclosure prevents the leakage of user data by preserving user data working not in an electronic computing machine. A part of a storage area of a main memory of a user terminal is used as a RAM disk. User data working is encrypted and stored in the RAM disk. The user data stored in the RAM disk is sent to a network storage, the RAM disk and the network storage are synchronized. Since the user data is controlled by using a driverware technology inside the electronic computing machine, and sent to the network, therefore the security is ensured.

30 Claims, 14 Drawing Sheets

(51) Int. Cl.
*G06F 21/62* (2013.01)
*G06F 21/64* (2013.01)
*G06F 21/60* (2013.01)
*G06F 21/00* (2013.01)

(56) References Cited

U.S. PATENT DOCUMENTS

| | | |
|---|---|---|
| 2013/0275770 A1 | 10/2013 | Berger |
| 2015/0199414 A1 | 7/2015 | Braginsky et al. |
| 2017/0230179 A1* | 8/2017 | Mannan ................ H04L 9/3226 |

FOREIGN PATENT DOCUMENTS

| | | |
|---|---|---|
| JP | 2011008813 | 1/2011 |
| JP | 2014509420 | 4/2014 |
| JP | 2014098977 | 5/2014 |
| JP | 2016148904 | 8/2016 |
| JP | 2017010424 | 1/2017 |
| JP | 2017084141 | 5/2017 |
| WO | 2013095596 | 6/2013 |

OTHER PUBLICATIONS

"International Search Report (Form PCT/ISA/210) of PCT/JP2019/046306," dated Mar. 3, 2020, with English translation thereof, pp. 1-4.

* cited by examiner

ELECTRONIC DATA MANAGEMENT DEVICE, ELECTRONIC DATA MANAGEMENT SYSTEM, AND NON-TRANSITORY COMPUTER-READABLE RECORDING MEDIUM

CROSS-REFERENCE TO RELATED APPLICATION

This application is a 371 application of the international PCT application serial no. PCT/JP2019/046306, filed on Nov. 27, 2019, which claims the priority benefit of Japan application no. 2019-001541, filed on Jan. 9, 2019. The entirety of each of the above-mentioned patent applications is hereby incorporated by reference herein and made a part of this specification.

BACKGROUND

Technical Field

The present disclosure relates to an electronic data management device, an electronic data management system, a program therefor and a recording medium for preventing and managing leakage of electronic data from an electronic computing machine by using volatile memory means.

Related Art

Various types of data, including personal information and business know-how, are often stored in a storage device or a recording medium of an electronic computing machine as a file in the form of electronic data. The electronic computing machine comprises a central processing unit, a main memory, an input/output means, a power supply means, etc., desktop computers, notebooks, smartphones, servers, etc. may be exemplified.

A user accesses an auxiliary storage device, built-in or externally attached to the electronic computing machine, browses or edits files, as well as sends them to others via a network, and uses them by transferring or copying them to built-in or externally attached devices of the electronic computing machine or other electronic computing machine.

Considering these usage patterns, in the view of protection and leakage prevention of electronic data, it is important to strictly manage the electronic data by obtaining the file, of course, and history which accessing the file or a storage device storing the file, especially history of browsing, editing, copying, printing, and sending the files. Also, an electronic computing machine is connected to a network, electronic data is stored in a network folder on the network, and its usage is growing recently by downloading them into the electronic computing machine.

In this way, if electronic data is stored in the network folder, there is no need to store electronic data in auxiliary storage devices of the electronic computing machine, in other words, it becomes data-less usage of the electronic computing machine. In the view of the leakage prevention of electronic data, especially confidential data, it is important to control the electronic computing machine in such way that electronic data may be used other than purpose.

A leakage route of electronic data from an electronic computing machine is considered that storing them into auxiliary storage devices, such as flash memories, connected to the electronic computing machine, temporary files of application programs, etc., and storing contents of a main memory (RAM: Random Access memory) into auxiliary storage devices, etc. by using a dump function and a hibernation function of an operating system.

Namely, electronic data stored in an auxiliary storage device of an electronic computing machine can be cause information leakage by being loss the electronic computing machine, illegally accessing to the electronic computing machine, duplicating the electronic data of the electronic computing machine by a user, etc. Prevention measures for these are performed by various ways and proposed. For example, when storing electronic data in an auxiliary storage device connected to an electronic computing machine, various measures are implemented such as encrypting the electronic data, authenticating the auxiliary storage device (For example, Patent literature 1).

A program for a system for data management disclosed in Patent literature 1 controls an electronic computing machine so as do not use user data of clients stored in a non-volatile memory other than purpose by the electronic computing machine processing them. In this system, the user data is stored only in the non-volatile memory approved by the electronic computing machine, but also is controlling the electronic computing machine so as do not take out to outside by other means.

In the case of temporary files, security is ensured by controlling storage destinations of the temporary files (For example, see Patent literature 2). In Patent literature 2, a data management system preventing information leakage, by the cause of temporary files created and stored on a client computer, is disclosed This data management system is encrypting and storing the temporary files created by application programs in folders, which are different from folders intended for the temporary file designated by the application programs, created on a hard disk drive of the client computer, a USB memory stick connected to the client computer, a server on a network, etc. Therefore, during operation of the application program, the information leakage caused by the temporary file can be prevented.

Also, in the case of suspected to have been stolen or lost an electronic computing machine, an always-on embedded theft response subsystem encrypting data of the electronic computing machine is disclosed (See Patent literature 3). In this system, also in the case of a hibernation function of the electronic computing machine, it has a function for encrypting the data of the electronic computing machine, or encrypting the entire storage of the electronic computing machine. Also, when an electronic computing machine shifts to a hibernation status, a method has also been proposed for preventing leakage of confidential information (For example, see Patent literature 4).

In this method, when the electronic computing machine shifts to the hibernation status, when storing contents of a volatile memory in a non-volatile memory, hibernation data are created and stored in the non-volatile memory so as that not including data of memory area (security area) allocated to an application in the volatile memory. Then, when recovers the electronic computing machine from the hibernation status, the hibernation data are written in the volatile memory from the non-volatile memory, after that security data is regenerated by the application by calling function passed with the allocation request of the memory area.

When a user accesses an auxiliary storage device of the electronic computing machine, by using a redirect function which transfers them a predetermined address on a network, electronic data can be stored in a folder on the network. Especially, in the progress of data-less use of electronic computing machine, when performing works using electronic data on the electronic computing machine, there is required a system that do not remaining them in the electronic computing machine.

Conventionally, some parts of a main memory are used as a pseudo auxiliary storage device for data-less use, and this is called as a RAM disk, etc. Data is prohibited to save in an auxiliary storage devices of a electronic computing machine, is redirected so as to write to the RAM disk, and the data is written in a virtual disk on a network (Patent literature 5). Using this function, the data is not stored in a local disk of the electronic computing machine, and is to be stored in a virtual drive on the network.

Therefore, if the electronic computing machine were to be lost, there is an advantage that no leakage of user data. A dump function of an operating system is basically performed for verification of a crush or a operation defect of the operating system and application programs. Normally, contents stored in storage devices of an electronic computing machine are collectively displayed, printed or stored, and this collective content is represented as a dump. In another words, the dump is the content of a main memory when performing data processing on the electronic computing machine, and is the content sequentially output data when performing data processing by a central processing unit (CPU).

Conventionally, by analyzing this dump, performs the verification for abovementioned crush, and the operation defect. Presently, also in the case of an operating system and an application program having huge amount of source codes, during operation of the operating system and the application program, especially when occurring the crush or the operation defect, contents of a main memory are dumped automatically, and output to an auxiliary storage device of an electronic computing machine.

By analyzing the dump file, it is possible to obtain user data being used by the running application program, and it is also called a security hall, which is used for cracking by a malicious user. When use dump files for verification of software, etc., since the dump files are output automatically, and causes problems when an electronic computing machine is lost, disposed, assigned to others, or leased.

A hibernation function is one of functions provided by an operating system. When power of an electronic computing machine is disconnected, before the disconnection, the work is interrupted, and the hibernation function duplicates and stores contents, stored in a main memory, in a auxiliary storage device. After disconnecting, when the electronic computing machine is restarted by connecting the power, the electronic computing machine runs the contents in the the main memory by reading them from the auxiliary storage device, and continues the interrupted work.

For example, if there is an editing file, when the hibernation starts, file contents being editing are stored with the status of working in the auxiliary storage device, then the power of the electronic computing machine is disconnected. When the electronic computing machine restarts, the hibernation contents are restored in the main memory from the auxiliary storage device, the work using the file can be performed continuously. Also, in case of becoming battery life of a notebook-type electronic computing machine low, also there is a function which is starting automatically a hibernation.

Thus, a hibernation function is represented uniquely depending on an operating system such as a sleep status (in Windows (Registered trademark)), Software Suspend (in macOS (Registered trademark)), Userspace Software Suspend (in LINUX (Registered trademark)), and is implemented on various operating systems. Using the hibernation function, there is an advantage that the operating system can be restart with high speed.

In the case of Windows, a hibernation function is stored in an auxiliary storage device, especially in a system drive of an operating system as a hibernation file (hiberfil.sys). In a next startup, an electronic computing machine can restart a work, which is before disconnecting power, by reading this file. Also a hibernation function is used to startup with high speed from a sleep status after disconnected power of an electronic computing machine.

By the hibernation function, a huge file is created in some cases, and is written every power disconnection, therefore it oppresses empty area of an auxiliary storage device, and also influences lifetime of the auxiliary storage devices. In the case of Windows, there is "powercfg" command for performing power setting, by option of "/hibernate" or "/h", it is set as like "powercfg/h off" or "powercfg/h on", a hibernation function can be used by using this command, but a user can use it selectively.

In the case of using this function, a startup time of an electronic computing machine can be quickly, but leakage of user data cannot be surely prevented caused by the hibernation function. In reverse, in the case of not using the hibernation function, the startup time of the electronic computing machine becomes longer, but leakage of user data does not occur caused by the hibernation function.

LITERATURE OF RELATED ART

Patent Literature

Patent Literature 1: Japanese Patent Publication No. 2011-8813A
Patent Literature 2: Japanese Patent Publication No. 2010-72885A
Patent Literature 3: International Publication No. WO2013/095596
Patent Literature 4: Japanese Patent Publication No. 2014-98977A
Patent Literature 5: Japanese Patent Publication No. 2017-10424A

SUMMARY

Problems to be Solved

However, data stored in an auxiliary storage device by a hibernation or a dump function has a disadvantage that contents of the data can be retrieved by analyzing the auxiliary storage device. Thus, when an electronic computing machine is lost, or the auxiliary storage device is disposed, there is a problem that user data stored in the auxiliary storage device may be not knowingly leaked by the hibernation function, the dump function, etc.

Also, it is preferable that a user data working should be safely stored in a network storage, etc., but not in a local auxiliary storage device. Therefore, a management method and a system therefore for managing electronic data are required so as to do not leak information by a hibernation function or a dump function of an operating system of an electronic computing machine, and also to do not leave user data working in the electronic computing machine.

The present disclosure has accomplished under the technical background such as described above.

The present disclosure provides an electronic data management device, an electronic data management system, a program therefor and a recording medium for protecting certainly electronic data of an electronic computing machine and preventing information leakage by using volatile memory means.

The present disclosure is related to provide an electronic data management device, an electronic data management system, a program therefor and a recording medium for preventing leakage of electronic data used in an electronic computing machine by a hibernation function, a dump function, etc., of an operating system.

Means to Solve the Problems

The present disclosure adopts the following means.

The present disclosures are an electronic data management device, an electronic data management system, a program therefor and a recording medium.

The electronic data management device of the present disclosure has next features.

The electronic data management device comprises an electronic computing machine communicating with a network storage which is a storage means on said network providing communication with each other, wherein said electronic computing machine comprising:
a central processing means for processing data in accordance with program code;
a main memory means for keeping said program code, or said program code and said data;
a non-volatile auxiliary storage means for content data of said main memory means when said program code and said electronic computing device paused;
an input means for entering instruction command or said data;
an output means for outputting said processing result to outside; and
a network connection means for connecting said network;
said electronic data management device further comprises an electronic data leak prevention function for preventing and controlling leaking said user data outside, when a user data operated by one or more operation selected from among browsing, editing, and changing, wherein said one or more operation is made by a application program, or, by input data inserted from said input means, wherein said user data comprising said application program operating on said electronic computing device or an electronic data used by a user; and
wherein said electronic data management device further comprises:
a virtual storage means driver allocated to said network storage;
a volatile memory means having function as a pseudo auxiliary storage means which is memory-resident in said main memory means, and virtual said auxiliary storage device;
a control means for obtaining said user data storage destination when said application program opens said user data, and for storing said user data in said volatile memory means, and for obtaining said user data from said volatile memory means when said user data is closed and stored, and for storing said user data via said virtual storage means driver;
an encryption means for encrypting said user data when said user data is stored in said volatile memory means; and
a decoding means for decoding said user data encrypted when said user data provided from said volatile memory means to said application program.

Also, the electronic data management device of the present disclosure has preferably next features.

Preferably, said storage destination is said network storage, and

Preferably, said electronic computing device comprises a cloud synchronization means for synchronizing said user data of said volatile memory means with said user data of said network storage via said virtual storage means driver.

Preferably, said electronic computing device comprises a driverware means which operates in a kernel mode, can be execute all commands provided by an operating system which make said electronic computing device operating, and for providing a common interface for communication between device drivers for directly controlling devices connected said electronic computing device, or for communication between said device and said application program driver operating on said electronic computing device;
said driverware means comprises a virtual storage means driver which is said device driver for controlling said virtual storage means driver, and a file system control part a volatile memory means driver which is said device driver for controlling said volatile memory means via a file system driver controlling output of said operating system; and
said file system control part obtains an operation which said application program opens said user data from said virtual storage means driver, obtains said user data from said cloud synchronization means, and stores said user data in said volatile memory means by sending to said volatile memory means via said volatile memory means driver.

Preferably, said electronic data management device performs authentication by an authentication means, confirming authenticity for user of said electronic computing device, when switch off by a suspend function to standby said electronic computing device; and said electronic data management device comprises a data deletion means for deleting data stored by said suspend function just before switched off and/or data stored by said suspend function, when the authentication is not successful.

Preferably, said electronic data management device stores data working in said auxiliary storage means when before the end of operation of said electronic computing device, and switched off by a suspend function which said electronic computing device standby, and performs authentication by an authentication means, confirming authenticity for user of said electronic computing device, when to restart; and said electronic data management device comprises an initialization means for performing initializing, when the authentication is not successful, one or more means selected a group of said data management device, said application program, said virtual disk, said virtual storage means driver, and said volatile memory means.

Preferably, said authentication means is one or more authentication means selected from a group of password authentication means, fingerprint authentication means, facial recognition means, server authentication means by authentication server, IC card authentication means, vein authentication means, photometric authentication means and 2 element authentication means.

Preferably, said data deletion means is executed based on information of a time table indicating a time zone for execution.

Preferably, said data deletion means becomes invalid when said electronic data management device located in a region range, permitted based on location information by a mobile communication base station or global navigation satellite system (GNSS); and said data deletion means is executed when said electronic data management device located outside said region range.

Preferably, said data deletion means is executed when said electronic data management device can not communicate with said authentication means.

Preferably, said data deletion means is executed when time information which said electronic data management device obtained from a time information means is out of setting time.

The electronic data management system of the present disclosure has next features.

An electronic data management system comprises an electronic computing machine, comprising:
  a network providing communication with each other;
  a network storage which is a storage means on said network; and
  an electronic computing machine communicating with a network storage which is a storage means on a network;
  wherein said electronic computing machine comprising:
  a central processing means for processing data in accordance with program code;
  a main memory means for keeping said program code, or said program code and said data;
  a non-volatile auxiliary storage means for content data of said main memory means when said program code and said electronic computing device paused;
  an input means for entering instruction command or said data;
  an output means for outputting said processing result to outside; and
  a network connection means for connecting said network;
  wherein said electronic computing device comprises an electronic data leak prevention function for preventing and controlling leaking said user data outside, when a user data is browsed or edited or changed by a application program, or, by input data inserted from said input means, wherein said user data comprising said application program operating on said electronic computing device or an electronic data used by a user;
  wherein said electronic computing machine comprising:
  a virtual storage means driver allocated to said network storage;
  a volatile memory means having function as a pseudo auxiliary storage means which is memory-resident in said main memory means, and virtual said auxiliary storage device;
  a control means for obtaining said user data storage destination when said application program opens said user data, and for storing said user data in said volatile memory means, and for obtaining said user data from said volatile memory means when said user data is closed and stored, and for storing said user data via said virtual storage means driver;
  an encryption means for encrypting said user data when said user data is stored in said volatile memory means; and
  a decoding means for decoding said encrypted user data, when provided said user data from said volatile memory means to said application program.

Also, the electronic data management system of the present disclosure has preferably next features.

Preferably, said storage destination is said network storage, and
said electronic computing device comprises a cloud synchronization means for synchronizing said user data of said volatile memory means with said user data of said network storage via said virtual storage means driver.

Preferably, said electronic computing device comprises a driverware means which operates in a kernel mode, can be execute all commands provided by an operating system which make said electronic computing device operating, and for providing a common interface for communication between device drivers for directly controlling devices connected said electronic computing device, or for communication between said device and said application program driver operating on said electronic computing device;
said driverware means comprises a virtual storage means driver which is said device driver for controlling said virtual storage means driver, and a file system control part a volatile memory means driver which is said device driver for controlling said volatile memory means via a file system driver controlling said operating system; and
said file system control part obtains an operation which said application program opens said user data from said virtual storage means driver, obtains said user data from said cloud synchronization means, and stores said user data in said volatile memory means by sending to said volatile memory means via said volatile memory means driver.

Preferably, said electronic data management device performs authentication by an authentication means, confirming authenticity for user of said electronic computing device, when switch off by a suspend function to standby said electronic computing device; and
said electronic data management device comprises a data deletion means for deleting data stored by said suspend function just before switched off and/or data stored by said suspend function, when the authentication is not successful.

Preferably, said electronic data management device stores data working in said auxiliary storage means when before the end of operation of said electronic computing device, and switched off by a suspend function which said electronic computing device standby, and performs authentication by an authentication means, confirming authenticity for user of said electronic computing device, when to restart; and
said electronic data management device comprises an initialization means for performing initializing, when the authentication is not successful, one or more means selected a group of said data management device, application program, said virtual disk, said virtual storage means driver, and volatile memory means.

Preferably, said authentication means is one or more authentication means selected from a group of password authentication means, fingerprint authentication means, facial recognition means, server authentication means by authentication server, IC card authentication means, vein authentication means, photometric authentication means and 2 element authentication means.

Preferably, said data deletion means is executed based on information of a time table indicating a time zone for execution.

Preferably, said data deletion means becomes invalid when said electronic data management device located in a region range, permitted based on location information by a mobile communication base station or global navigation satellite system; and said data deletion means is executed when said electronic data management device located outside said region range.

Preferably, said data deletion means is executed when said electronic data management device can not communicate with said authentication means.

Preferably, said data deletion means is executed when time information which said electronic data management device obtained from a time information means is out of setting time.

The program for electronic data management device of the present disclosure has next features.

Said electronic data management device comprises an electronic computing machine communicating with a network storage which is a storage means on said network providing communication with each other.

Said electronic computing machine is comprising:
- a central processing means for processing data in accordance with program code;
- a main memory means for keeping said program code, or said program code and said data;
- a non-volatile auxiliary storage means for content data of said main memory means when said program code and said electronic computing device paused;
- an input means for entering instruction command or said data;
- an output means for outputting said processing result to outside; and
- a network connection means for connecting said network.

Said electronic computing device comprises an electronic data leak prevention function for preventing and controlling leaking said user data outside, when a user data is browsed or edited or changed by a application program, or, by input data inserted from said input means, wherein said user data is comprising said application program operating on said electronic computing device or an electronic data used by a user.

Said program for electronic data management device causes in said electronic data management device to execute steps of:
- a step generating a virtual storage means driver allocated to said network storage;
- a step controlling said virtual storage means driver;
- a step generating a volatile memory means having function as a pseudo auxiliary storage means which is memory-resident in said main memory means, and virtual said auxiliary storage device;
- a step obtaining said user data from storage destination when said application program opens said user data;
- a step storing said obtained said user data in said volatile memory means;
- a step obtaining said user data from said volatile memory means when said user data is closed and stored;
- a control step for storing said obtained user data by control means said via said virtual storage means driver;
- a step encrypting by an encryption means when said user data is stored in said volatile memory means; and
- a step decoding said encrypted user data by a decoding means when said user data is provided from said volatile memory means to said application program.

Also, the program for electronic data management device of the present disclosure has preferably next features.

Preferably, said program for electronic data management device further comprises:
- an application program interface part for causing said electronic computing device to execute a function for receiving first data including a command and/or data output from said application program, and for sending second data including execution result of said command and/or received data received from said device driver to said application program,
- a device driver control part for causing said electronic computing device to execute a function for sending third data including said command and/or said data to said device driver, and for receiving fourth data execution result of said command and/or said received data from said device driver,
- a control part for causing said electronic computing device to execute a function for performing a control of said first data to fourth data by generating said second data or said third data by processing said first data or said fourth data, and
- an encryption part for causing said electronic computing device to execute a function for generating encrypted data by encrypting data, and an decryption part for causing said electronic computing device to execute a function for generating said original data by decoding said encrypted data;

said driverware operates in a kernel mode, can be execute all commands provided by an operating system which make said electronic computing device operating, and provides a common interface for communication between device drivers for directly controlling devices connected said electronic computing device, or for communication between said device and said application program driver operating on said electronic computing device;

said device driver control part comprises a virtual storage means driver which is said device driver for controlling said virtual storage means driver, and a file system control part a volatile memory means driver which is said device driver for controlling said volatile memory means via a file system driver controlling output of said operating system; and said file system control part is preferably causing said electronic data management device to execute steps of:
- a step for obtaining an operation to open said user data by said application program from said virtual storage means driver,
- a step for obtaining said user data from said cloud synchronization means,
- a step for sending said user data, which is obtained, via said volatile memory means driver to said volatile memory means, and
- a step for storing said user data, which is sent, to said volatile memory means.

Preferably, said storage destination is said network storage, and said program for electronic data management device comprises a cloud synchronization program for causing said electronic data management device to execute an function for synchronizing said user data of said volatile memory means with said network storage via said virtual storage means driver.

Preferably, said program for electronic data management device comprises a cloud synchronization program for causing said electronic data management device to execute steps of:
- a suspend step for switching off said electronic data management device by a suspend function to standby said electronic computing device,
- a suspend authentication step for authenticating by an authentication means for confirming authenticity for user of said electronic computing device, when said electronic data management device restarts after switched off, and
- a data deletion step for deleting data stored by said suspend function just before switched off and/or data stored by said suspend function, when the authentication is not successful.

Also, preferably, said program for electronic data management device for causing said electronic data management device to execute steps of:
- a suspend step for switching off said electronic data management device by a suspend function which stores working data in auxiliary storage means when operation of said electronic computing device ends.
- a suspend authentication step for authenticating by an authentication means for confirming authenticity for user of said electronic computing device, when said electronic data management device restarts after switched off, and
- an initialization step for performing initializing, when the authentication is not successful, one or more means selected a group of said data management device, application program, said virtual disk, said virtual storage means driver, and volatile memory means.

Preferably, said suspend authentication step for causing said electronic data management device to execute an authentication step for authenticating by one or more authentication means selected from a group of password authentication means, fingerprint authentication means, facial recognition means, server authentication means by authentication server, IC card authentication means, vein authentication means, photometric authentication means and 2 element authentication means.

Preferably, said program for electronic data management device for causing said electronic data management device to execute said data deletion step based on information of a time table indicating a time zone for execution.

Preferably, said program for electronic data management device for causing said electronic data management device to not execute said data deletion step when said electronic data management device located in a region range, permitted based on location information by a mobile communication base station or global navigation satellite system (GNSS); and said program for electronic data management device for causing said electronic data management device to execute said data deletion step when said electronic data management device locates outside said region range.

Preferably, said program for electronic data management device for causing said electronic data management device to execute said data deletion step when said electronic data management device can not communicate with said authentication means.

Preferably, said program for electronic data management device for causing said electronic data management device to execute said data deletion step when time information, which said electronic data management device obtained from a time information means, is out of setting time.

The recording medium recording the program for electronic data management device of the present disclosure is a recording medium recording program for electronic data management device recorded abovementioned program for electronic data management device.

Effect

The present disclosure affords the following effects.

By the present disclosure, electronic data of an electronic computing machine can be certainly protected and a information leakage can be prevented by using volatile memory means of the electronic computing machine as a working folder, by storing electronic data in a network storage, and by eliminating entire user data using when an operation of an application program ends or power supply of the electronic computing machine is disconnected.

By the present disclosure, an information leakage can be prevented by controlling a volatile memory means by driverware means of an electronic computing machine, by backing up always or periodically electronic data of the volatile memory means in a network folder, especially by backing up user data, stored by a hibernation function, with encryption in a local auxiliary storage means.

Also, by the present disclosure, an information leakage can be prevented by controlling a volatile memory means by a driverware means of an electronic computing machine, by backing up always or periodically electronic data of the volatile memory means in a network folder, especially by backing up user data, stored by a dump function, with encryption in a local auxiliary storage means.

DESCRIPTION OF THE EMBODIMENTS

Hereafter, an embodiment of the present disclosure is described based on drawings.

The First Embodiment of the Present Disclosure

Figure 1:
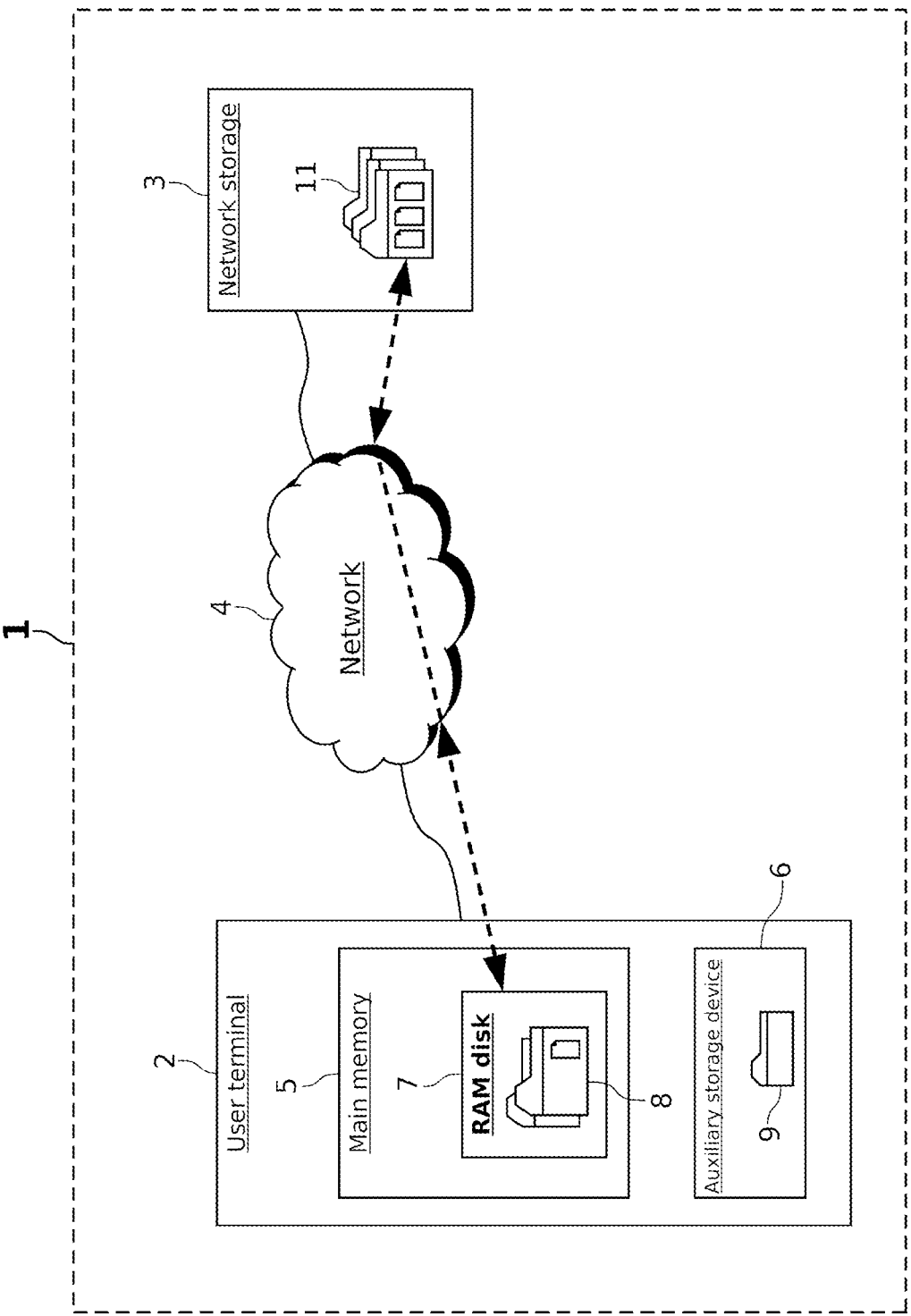
FIG. 1 is a block diagram illustrating an overview of an electronic data management system 1 for electronic computing machine of the first embodiment of the present disclosure.

Hereafter, an electronic data management system 1 for electronic computing machine of the first embodiment of the present disclosure is described with reference to drawings. FIG. 1 is a block diagram illustrating an overview of the electronic data management system 1 for electronic computing machine of the first embodiment of the present disclosure.

The electronic data management system 1 for electronic computing machine prevents a leakage of electronic data of an electronic computing machine by using a volatile memory means of the electronic computing machine. The electronic data management system 1 for electronic computing machine stores user data working in the volatile auxiliary storage means of the electronic computing machine.

Especially, the electronic data management system 1 for electronic computing machine prevents the leakage of electronic data of the electronic computing machine by storing the user data, used by an application program running on the electronic computing machine, in a network storage on a network, but not in a local auxiliary storage device. In this time, the application program uses a RAM disk which is a volatile memory means as a working folder.

For more details, the electronic computing machine operating with connection to the network stores the electronic data with encryption in a storage device on the network. The electronic data management system 1 for electronic computing machine of the first embodiment of the present disclosure uses, for example, a driverware (Registered trademark by the present applicant) technology as a concrete means for solving the problems, to control the electronic computing machine, and safely transfers with high speed the electronic data to the storage device on the network. Also, a pseudo storage means is set up in a main memory of the electronic computing machine, and an application program and the electronic data are handled on this pseudo storage device.

Hereafter, a configuration and an operation procedure of the electronic data management system 1 for electronic computing machine is described concretely. The electronic data management system 1 for electronic computing machine illustrated in FIG. 1 is comprising a user terminal 2, a network storage 3, a network 4, etc. The user terminal 2 is an electronic computing machine which a user operates, and user data used in the user terminal 2 is stored basically in the network storage 3.

The network storage 3 is a storage connected to the user terminal 2 by a communication network such as the network 4. The network storage 3 is also called an auxiliary storage device on the network 4, or a cloud storage. The user terminal 2 and the network storage 3 are connected to the network 4 such as the Internet. The user terminal 2 obtains user data from the network storage 3 via the network 4.

The user data include user data used at the user terminal 2, user data derived or created from this user data in the user terminal 2, a new user data newly created, etc., and hereafter it includes all these data and is referred only "user data". The user data is sent from the user terminal 2 to the network storage 3 via the network 4, and stored in the network storage 3.

The network storage 3 stores and saves the user data used by the user terminal 2. The network storage 3 is a storage device in a web server or a file server (not shown), in other words, a non-volatile auxiliary storage device. The network storage 3 is a storage device connected to the user terminal 2 via the network 4 such as a storage mounted to a dedicated server, a distribution managed network storage, a storage of a cloud service (a cloud storage).

In the present embodiment, the network storage 3 means an arbitrary storage device which can store user data including the cloud storage. The network 4 is an arbitrary wired or wireless communication network known, but is preferable a local area network (LAN) or the Internet. In the present embodiment, the network 4 is described as the Internet.

The user terminal 2 is an electronic computing machine operated and used by the user (Described below in detail). The user terminal 2 can be directly connected to the network 4, but not shown, is generally used connecting via a communication means such as a wireless gateway, a proxy server, a router, a wireless access point, and the electronic data management system 1 for electronic computing machine of the present disclosure includes these communication means.

In the present embodiment, since the connection connecting the user terminal 2 to the network 4, and the means therefor are not the gist of the disclosure, the detailed description is omitted. In data communication between the user terminal 2 and the network storage 3, the electronic data communicating is sent and received between them by encrypting and using specific communication protocol. For the communication protocol can use arbitrary communication protocols, but use protocols compliant with ISO reference model, especially use preferably protocols used in the Internet for general-propose such as TCP/IP.

In the user terminal 2, the user data is used by storing in a RAM disk 7 on a main memory 5 of the user terminal 2. A plurality of folders 8 are created in the RAM disk 7, and are used as like as folders 9 created in a general-purpose auxiliary storage device 6 (Non-volatile memory device). For the user using the user terminal 2 and the application programs operating on the user terminal 2, it is operated as like as the general-purpose auxiliary storage devices and folders therein.

In the user terminal 2, the user data is encrypted, and sent to the network storage 3 according to specific communication protocols via the network 4. In the network storage 3, this encrypted user data is stored in the specific folder 11. The folders 11 can be preferably a folder allocated to each user terminal 2, or a folder allocated to each user.

The user terminal 2 obtains data from the network storage 3 via the network 4. A flow of this communication is illustrated conceptually by dashed lines in FIG. 1. When the user terminal 2 stores contents of the RAM disk 7 to the network storage 3 (backing up or synchronizing), it can be set schedule for each folder 8.

For example, at predetermined time, when required from an application program or a service of an operating system, etc., or an instruction from the user, the user terminal 2 sends all contents from a designated folder 8, or the RAM disk 7. Or, the user terminal 2 sends the difference from the previously sent content of the RAM disk 7, or the folder 8 to the network storage 3.

The configuration of the user terminal 2 is described below, but as shown in FIG. 1, the user terminal 2 comprises the main memory 5, the auxiliary storage device 6, the RAM disk 7 in the main memory 5, etc., as a storage means. The main memory 5 is a RAM (Random Access Memory) of an electronic computing machine, and is a volatile memory. When a power supply is stopped, it has the feature that data which stored in the main memory 5 volatiles (extinguishes) and is erased.

According to this feature, when the power supply of the user terminal 2 is stopped, all electronic data of the main memory 5 are erased, therefore, the contents of the RAM disk 7 using a part of the main memory 5 are extinguished. As the auxiliary storage device 6, it can be exemplified by a HDD (Hard disk drive), a SSD (Solid state drive), etc. In other words, the RAM disk 7 is a pseudo storage device.

Generally, in an electronic computing machine, an application program and user data are stored in an auxiliary storage device. During an operation of the electronic computing machine, the application program is executed after reading its program code from the auxiliary storage device and stored in the main memory, then, necessary data for the application program are processed after read from the auxiliary storage device.

When the application program obtains data from the network and processes it, the data obtained from the network is stored in a cash area of the auxiliary storage device, then, the application program obtains the data from this cash area and processes. On the other hand, the electronic data management system 1 for electronic computing machine of the present disclosure do not stores data working in the auxiliary storage device of the electronic computing machine, but stores data working in the pseudo auxiliary storage device, provided in the main memory of the user terminal 2, operating as an auxiliary storage device As shown in FIG. 1, the pseudo auxiliary storage device like this is provided as the RAM disk 7 in the main memory 5. In other words, the RAM disk 7 is a storage device which memory-resident in the main memory 5. For more details, it is an area allocated of a part of the area of the main memory 5 to as the RAM disk 7. After the user terminal 2 operates and the Operating System operates, a control application program, such as a driverware 34 (See FIG. 3), is read from the auxiliary storage device 6 of the user terminal 2, and deployed in the main memory 5 and operates.

Therefore, an area for the RAM disk 7 is secured in the main memory 5, and is registered as a storage device in the file system of an Operating System 30 of the user terminal 2. Therefore, the RAM disk 7 becomes a virtual auxiliary storage device or a pseudo auxiliary storage device, operates as an auxiliary storage device. In the user terminal 2, the RAM disk 7 is handled as like other auxiliary storage devices such as the auxiliary storage device 6 of the the user terminal 2.

Therefore, the application program operates using the RAM disk 7 as a working storage device, the folder 8 inside the RAM disk 7 as a working folder. This time, the application program obtains necessary user data from the network storage 3 via network 4, etc., stores them in the RAM disk 7, and operates.

When the power of the user terminal 2 is disconnected, because the contents of the main memory 5 are eliminated, the contents of the RAM disk 7 are also eliminated. By this, the application program running by using RAM disk 7 is stopped, and the user data stored in the RAM disk 7 are all deleted. Therefore user data required confidentiality can not be leak outside from the user terminal 2.

The user data stored in the RAM disk 7 is stored encrypted. Since the electronic data management system 1 for electronic computing machine is using the RAM disk 7 as an auxiliary storage device, in the user terminal 2, when the hibernation function of the Operating System starts, contents of the main memory 5 are stored in a local auxiliary storage device such as the auxiliary storage device 6.

In this time, encrypted contents of the RAM disk 7 are stored in the local auxiliary storage device by the hibernation function, but the contents can not be read because of encrypted. After the execution of the hibernation function, or, without of execution of the hibernation function, when the power of the user terminal 2 is disconnected, because the contents of the main memory 5 and the contents of the RAM disk 7 are deleted, the user data, etc. can not be leaked.

In other words, by analyzing the user terminal 2, the user data can not be obtained. When using the hibernation function like the conventional technology, there is no leakage of the user data. The same can be said for the dump function. When the user terminal 2 output contents of the main memory 5 for the dump function, the encrypted contents of the RAM disk 7 are output and stored as a dump file in a local auxiliary storage device such as the auxiliary storage device 6.

Then, when the power of the user terminal 2 is disconnected, because contents of the main memory 5 and contents of the RAM disk 7 are deleted, the user data, etc. included in the dump file can not be leaked. By analyzing the user terminal 2, because the user data is encrypted, the user data can not be obtained.

Figure 2:
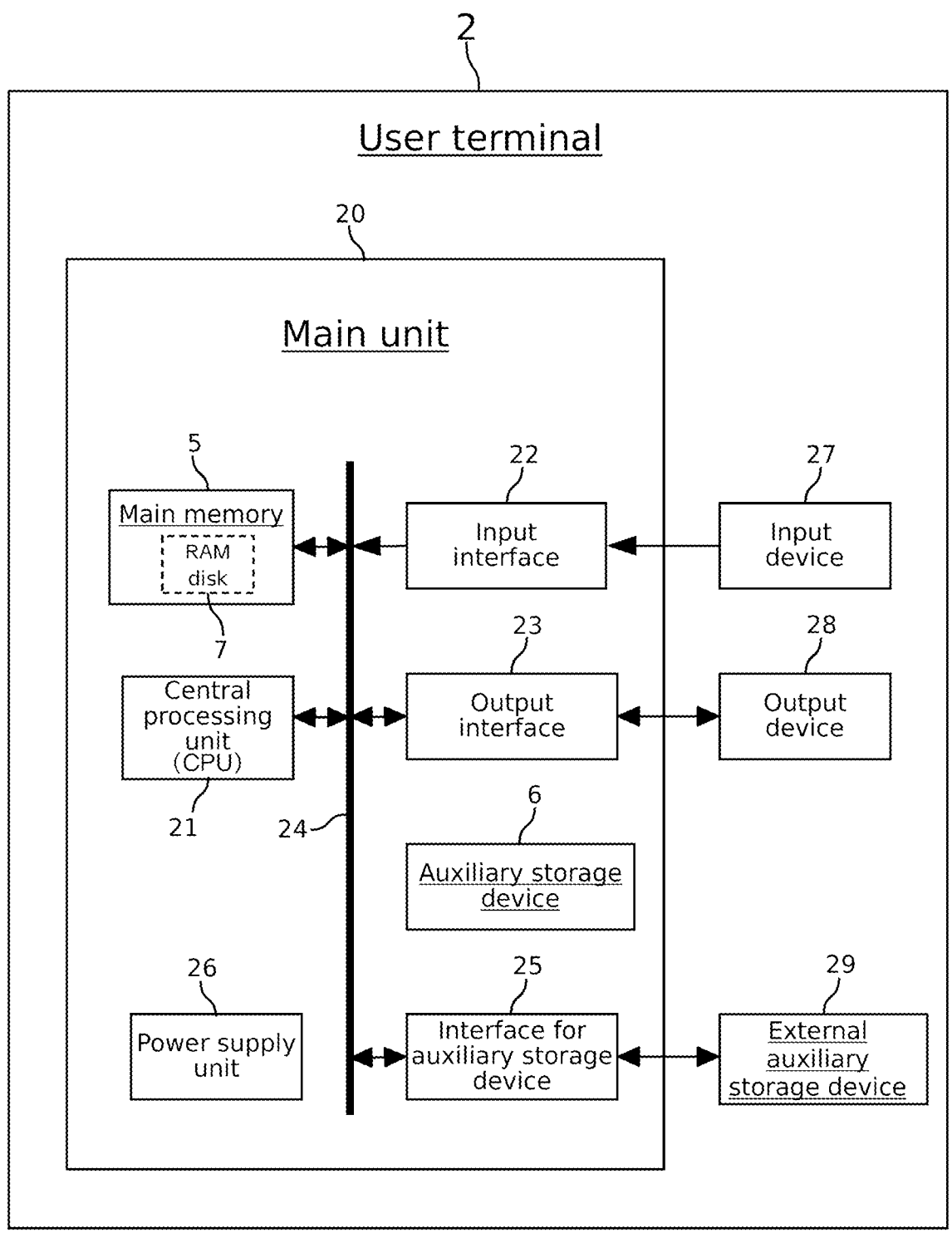
FIG. 2 is a functional block diagram illustrating a hardware configuration of a user terminal 2 of an electronic data management system 1 for electronic computing machine of the first embodiment of the present disclosure.
Figure 3:
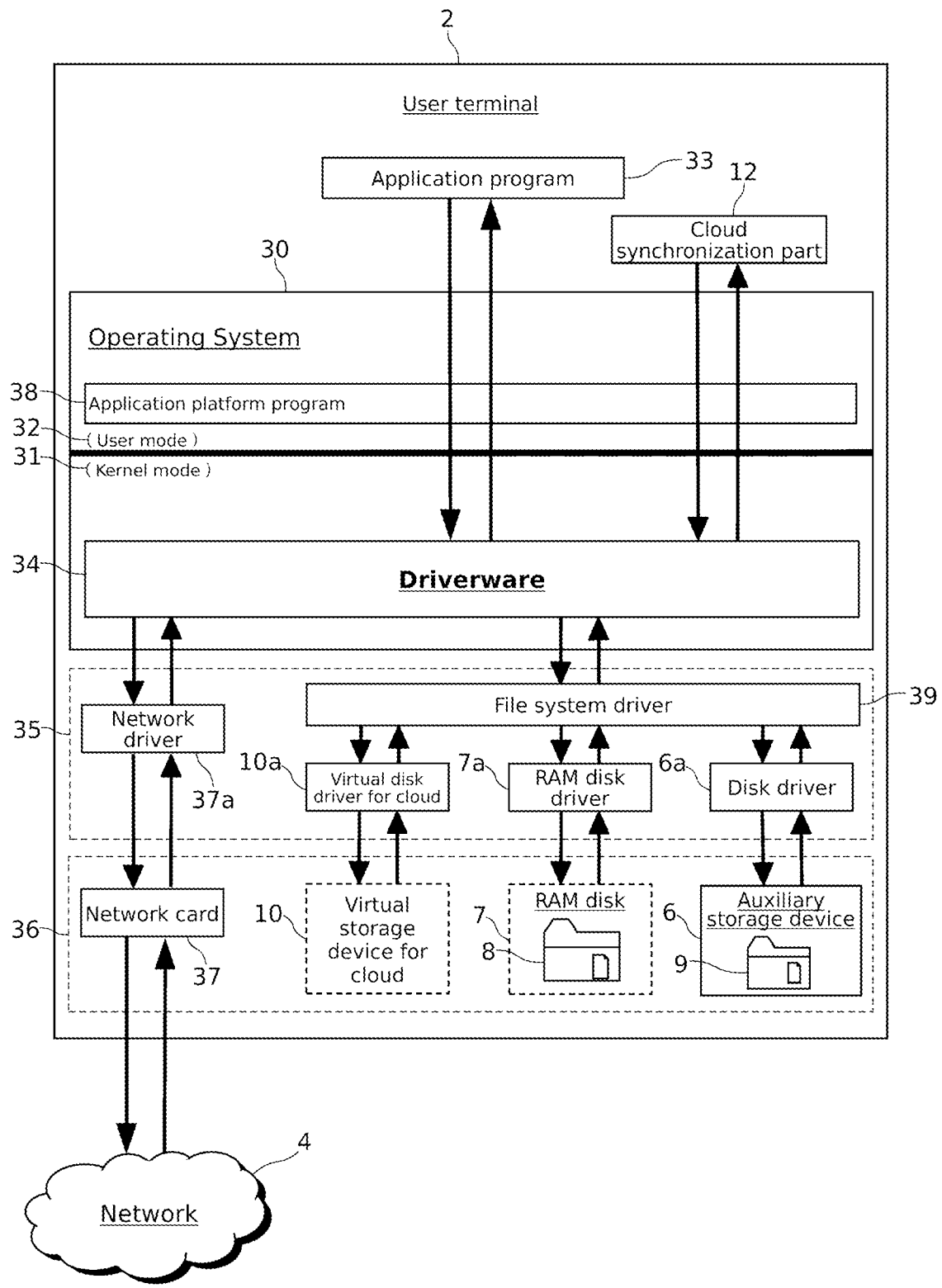
FIG. 3 is a functional block diagram illustrating an example of a software environment operating on a user terminal 2 of an electronic data management system 1 for electronic computing machine of the first embodiment of the present disclosure.

Described above, the flow of the user data in the user terminal 2, especially the control of the RAM disk 7 is performed by using the driverware (Registered trademark) technology. Hereafter, an overview of a configuration and functions of the user terminal 2 and the driverware are described briefly. In FIG. 2, an example of a hardware configuration of the user terminal 2 is illustrated mainly. In FIG. 3, an overview of the user terminal 2 including a software environment operating on the the user terminal 2 is illustrated mainly.

[Hardware Configuration of the User Terminal 2]

The user terminal 2 is a general-purpose electronic computing machine comprising a central processing means, a main memory means, an input means, an output means, etc. A block diagram in FIG. 2 is illustrating an example of a configuration of the user terminal 2. As shown in FIG. 2, the user terminal 2 comprises a central processing unit (CPU) 21, the main memory 5, an input interface 22, an output interface 23, a bus 24, a power supply unit 26, an input device 27, an output device 28, etc., which are embodied in a main unit 20.

The main unit 20 builds in a main board (not shown) equipped with the central processing unit 21, the main memory 5, the input interface 22, the output interface 23, the bus 24, etc., and the power supply unit 26, etc. The power supply unit 26 is used to supply power to each configuration element and devices of the user terminal 2, comprising a battery or a commercial power adapter, etc., and the detailed explanation is omitted.

The input device 27, the output device 28, etc. are peripheral devices used by connecting to the main unit 20, but in the case of an integrated-type electronic computing machine such as a notebook-type electronic computing machine, there can be configured build-in or integrated to the main unit 20. A touch-type panel, comprising an input function and an output function, can be also used as the input device 27 and/or the output device 28. The user terminal 2 comprises the built-in auxiliary storage device 6 and an external auxiliary storage device 29 as an auxiliary storage device.

Also, the user terminal 2 further comprises an interface for auxiliary storage device 25 for an external auxiliary storage device 29. The main memory 5, the central processing unit 21, the input interface 22, and the output interface 23 are connected with each other through the bus 24, and send and receive data between each other via this bus 24. There are cases having signal processing devices for performing specific signal processing, but the detailed explanation is not the gist of the present disclosure and is omitted.

The interface for auxiliary storage device 25 is a kind of the input interface 22 and/or the output interface 23 (Both called "input-output interface"), but it is illustrated here since it is an indispensable element of the disclosure for the external auxiliary storage device 29. The external auxiliary storage device 29 is a device fundamentally having the same function with the auxiliary storage device 6, therefore hereafter described only the auxiliary storage device 6 as an example.

The main memory 5 is a storage device such as the RAM. The central processing unit 21 controls an operation of the user terminal 2, and controls the operation of the user terminal 2 by a program stored in the main memory 5 so as executing processing commands of the program sequentially. The input device 27 such as a mouse and a keyboard is connected to the input interface 22. The auxiliary storage device 6 and the external auxiliary storage device 29 are non-volatile memory devices such as HDD (Hard Disk Drive), SSD (Solid State Drive).

In the auxiliary storage device 6 stored the Operating System, application programs, electronic data, etc. Generally, the application program is called, deployed in the main memory 5, and operates. The user terminal 2 is comprising a plurality of interfaces for connecting other devices such as a board for communication, as the network card 37 shown in FIG. 3 and FIG. 4, and the detailed description is omitted.

[Software Configuration of the User Terminal 2]

In FIG. 3, an overview of a software operating on the user terminal 2 is illustrated. In the user terminal 2, the Operating System 30 is operating, and an application program 33 is operating on a platform provided by the Operating System 30.

As shown in FIG. 3, the user terminal 2 is comprising devices 36 such as a network card (a LAN card) 37, the auxiliary storage device 6. The RAM disk 7 is shown by dashed line, this means that the RAM disk 7 exists physically not independent, but a pseudo storage device operating softwarely using a part of the physical memory of the main memory 5. As the same, a virtual storage device for cloud 10 shown by dashed line is a dedicated storage device for sending and receiving data to/from the network storage 3.

The virtual storage device for cloud 10 is a virtual storage device (a pseudo storage device) operating softwarely. In other words, this virtual storage device has no substantial area, etc. for storing data, and is a pseudo auxiliary storage device as seen an auxiliary storage device from the user side, and the substantial access is redirected to another auxiliary storage device when access to this. These devices 36 are controlled by device drivers 35 such as a network driver 37*a*, a disk driver 6*a*, a RAM disk driver 7*a*, a virtual disk driver for cloud 10*a*, a file system driver 39.

Specifically, the network card 37 is controlled by the network driver 37*a*, the auxiliary storage device 6 is controlled by disk driver 6*a*. Also, the RAM disk 7 and the virtual storage device for cloud 10 are controlled by the RAM disk driver 7*a* and the virtual disk driver for cloud 10*a* respectively.

The file system driver 39 controls device drivers for storage devices such as the disk driver 6*a*, the RAM disk driver 7*a* and the virtual disk driver for cloud 10*a*. Consequently, the file system driver 39 becomes a front interface for an input/output function (a I/O function) provided by the Operating System 30, and controls the auxiliary storage devices such as the auxiliary storage device 6, the RAM disk 7, the virtual storage device for cloud 10.

The Operating System 30 originally controls the devices 36 by the device drivers 35 via its input/output function (I/O function). The Operating System 30 has a kernel mode 31, executable all commands provided by the Operating System 30, and a user mode 32, restricted some of the commands.

The application program 33 operating on the user terminal 2 operates in the user mode 32. The application programs 33 operate in the kernel mode 31, but these are not limited to special programs access directly system resources. General-purpose application programs, especially object-oriented application programs operate fundamentally in the user mode 32, when access to the kernel mode 31, use functions such as the input/output function provided by the Operating System 30.

In the present disclosure, the input/output function of the Operating System 30 and the device drivers 35 are controlled by the driverware 34 which is located between the Operating System 30 and the device drivers 35. Functions and an configuration of the driverware 34 are described below in detail. The auxiliary storage device 6 has above described functions and comprises one or more storages. Hereafter, only one auxiliary storage device 6 is described as an example, but not limited.

In the auxiliary storage device 6 stores source codes of various application programs 33, modules, etc., for example, codes of the Operating System 30, program codes necessary for the operation of the user terminal 2 (Hereafter, describes only the Operating System 30, the application program 33, a module, etc.). Also, the auxiliary storage device 6 can store user data.

The user data is stored generally with encryption or without encryption in the auxiliary storage device 6 depending on user's requests, the specification or requests of the application program 33. In the present embodiment, the user data is an electronic data, etc. used by the application program 33, or users.

The user data refer to arbitrary format files, and backup files thereof, specially not limited, such as text files, picture files, video files, audio files, document files with various formats (Word, pdf, etc.), computer program code files, executable files (.exe files), communication histories, operation histories of application programs, backup files of operating systems or application programs, various temporary files, memory contents.

Also, user data should be interpreted widely including data necessary of data management such as encryption/decryption codes, identification numbers, passwords, individual information, client data, business know-how, information related to confidential data, documents thereof. The user terminal 2 is comprising hardware devices 36 such as the network card 37, the auxiliary storage device 6, and device drivers 35 which are software for controlling the devices 36.

The device drivers 35 are located between the Operating System 30 and the devices 36, and perform sending and receiving data between them. The Operating System 30 controls devices 36 via device drivers 35 using its I/O function. By publishing specific functions as a part of functions of the Operating System 30, the I/O function can access the devices 36, and the device drivers 35, and perform data transmission and reception by using these.

As shown in FIG. 3, the user terminal 2 is comprising abovementioned RAM disk 7, and the RAM disk 7, even a pseudo device, operates so as a hardware as like the devices 36 such as the network card 37, the auxiliary storage device 6. Therefore, the RAM disk driver 7a locates among the device drivers 35 between the Operating System 30 and the RAM disk 7, and controls the RAM disk 7.

The virtual storage device for cloud 10 is a pseudo-device, but operates as a hardware as the same. An application platform program 38 locates between the application program 33 and the Operating System 30, controls the communication between the application program 33 and the Operating System 30, and is a program operating in the user mode 32.

The application platform program 38 operates in corporation with the driverware 34, sends communication data obtained in the user mode 32 to the driverware 34, and controls the application program 33 and the Operating System 30 by the instruction of the driverware 34.

A cloud synchronization part 12 is a dedicated application program or a module for communicating with the network storage 3 (See FIG. 1), and operates in the user mode 32. The cloud synchronization part 12 operates in corporation with the driverware 34 to synchronize the virtual storage device for cloud 10 with the network storage 3. The cloud synchronization part 12 obtains data inside the virtual storage device for cloud 10 via the file system driver 39 and the driverware 34.

The cloud synchronization part 12 sends this data obtained to the network storage 3 via the driverware 34, the network driver 37a, and the network card 37. In reverse, the cloud synchronization part 12 obtains data from the network storage 3 via the network card 37, the network driver 37a, and the driverware 34, and stores in the virtual storage device for cloud 10 via the driverware 34 and the file system driver 39.

General-purpose services providing cloud storages provide interfaces (I/F) basically in the user mode and are accessed by the cloud synchronization part 12, operating in the user mode. Therefore, to take an access permission, for the first connection to the cloud storage, cloud storage account (ID and password) is input in the user mode by using standard I/F provided.

[Description of the Driverware]

Figure 4:
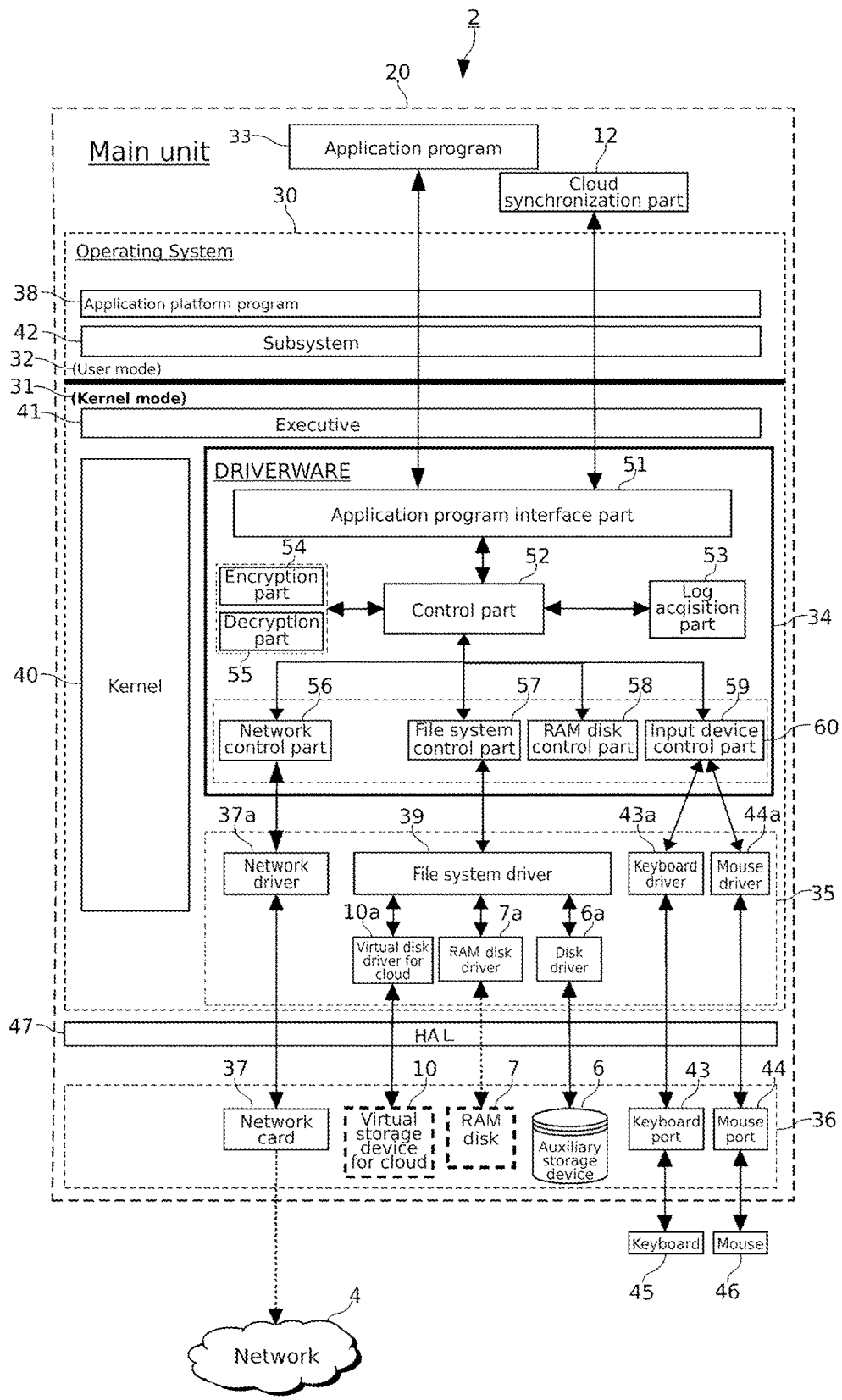
FIG. 4 is a functional block diagram illustrating an overview of a software on a user terminal 2 of an electronic data management system 1 for electronic computing machine of the first embodiment of the present disclosure.

FIG. 4 is illustrating an overview of software, including the driverware 34, operating on the user terminal 2. Referencing to this drawing, an overview of the Operating System 30, the driverware 34, etc. operating on the user terminal 2 is described. In the present embodiment, the Operating System 30 is described as Windows which is Windows XP (Registered trademark) or later version, provided by Microsoft as an example.

However, this does not limit the type of the Operating System 30 used in the present disclosure, arbitrary Operating Systems can be used if it realizes the same functions. The user terminal 2 is comprising the Operating System 30, the driverware 34, etc. operating as software, and the main unit 20 comprising the network card 37, the auxiliary storage device 6, a keyboard port 43, a mouse port 44, etc. as hardware (the devices 36).

The user terminal 2 is comprising a Hardware Abstraction Layer (HAL) 47 located between the software and the hardware. The driverware 34 is a program operating in the kernel mode 31 of the Operating System 30. The user terminal 2 is comprising input devices such as a keyboard 45 connected to the keyboard port 43, a mouse 46 connected to the mouse port 44, a display (now shown), etc.

The user terminal 2 has, not shown, a connector for connecting peripherals, the connector is preferably a serial port such as SATA, RS-232C, IrDA, USB, IEEE1394, a parallel port such as IEEE1284, SCSI, IDE, etc. The keyboard port 43 and the mouse port 44 are one kind of the connectors. The user terminal 2 can be having a scanner, printer, etc., and they are connected to the connectors.

The application program 33 operating on the user terminal 2 performs input/output from/to the Input/Output device by using functions provided by the Operating System 30. The application program 33 is an executable file or a software operating in the kernel mode 31 or the user mode 32 of the Operating System 30.

For example, the application program 33 is a software for creating, editing documents such as a word processing software, a text editor, or a software for browsing, creating editing a specific format file such as pdf type file.

The Operating System 30 provides basic functions such as input/output functions from input-output devices such as inputting from the keyboard 45, inputting from the mouse 46, outputting to a display, and managing storage devices, memories, and is a software for making operating and managing entire the user terminal 2. The Operating System 30 also called a fundamental software.

The Operating System 30 is comprising a plurality of executable programs to realize functions provided. There are a number of many books about the Operating System 30, especially Windows Operating System using in the embodiment of the present disclosure, and here introduce some of them. Technology knowledge written in these books published, especially knowledge related to device driver development are required to realize the present disclosure.

Books about internal configurations and its operation of Windows Operating System:
Inside Windows NT by Helen Custer (Microsoft Press, 1992)
Inside the Windows NT File System by Helen Custer (Microsoft Press, 1994)
Inside Microsoft Windows 2000, Third Edition by David A. Solomon, Mark E. Russinovich (Microsoft Press, 2000), Books about basic and development knowledge related to device drivers:
Programming the Microsoft Windows Driver Model by Walter Oney (Microsoft Press, 1999)
Programming the Microsoft Windows Driver Model, Second Edition by Walter Oney (Microsoft Press, 2002).

Here, typical configurations of configuration elements of the Operating System 30 is described referencing to FIG. 4. The Operating System 30 is comprising a kernel 40, an executive 41, a subsystem 42, the device driver 35, a HAL 47, etc. The subsystem 42 is a service provided in the user mode 32 of the Operating System 30.

The executive 41 provides basic services of the Operating System 30 such as memory management, process and thread management, security, I/O (input-output), networking, communication between processes. The kernel 40 provides low level functions such as thread scheduling, interrupting, exception notification, multiprocessor synchronization. Also, the kernel 40 provides routine sets and basic objects which are used in the executive 41.

The device driver 35 is generally created for every hardware connected to the user terminal 2, and controls directly the device 36 via the HAL 47. The device driver 35 provides services converting an input/output function request (I/O call request) from the application program 33 or the Operating System 30, to an input/output function request (I/O request) for a specific device 36, and provides system services such as file system, network driver.

The HAL 47 is a code layer for abstracting by separating the kernel 40, the device driver 35, and executive 41 from the platform specific hardware functions. The HAL 47 absorbs the difference of type or model of the hardware such as internal devices of the user terminal 2, external devices connected to the user terminal 2, and provides abstracting services to each service of the Operating System 30

Various services configuring the Operating System 30 can access the hardware without consciousness the difference of the type or model of the hardware. As abovementioned, the Operating System 30 is described its representative configuration and functions, but the details is given to related books, web sources, etc., and the detailed description is omitted.

[Driverware 34]

The driverware 34 realizes sending and receiving data between the device drivers 35 in the kernel mode 31. When transfer data between the device drivers 35 in the kernel mode 31, the data transfer can be performed with high speed, together with data security can be ensured. Therefore, there is an advantage that a huge amount of data can be transfer at high speed in a short time.

When accesses from the application program 33 to the device driver 35, or when sends data from the device driver 35 to the application program 33, the driverware 34 provides a common interface. The driverware 34 operates in the kernel mode 31 of the Operating System 30.

The driverware 34 has functions of providing data sending and receiving and controlling, not only between the device drivers 35, between the Operating System 30 and the device drivers 35. The driverware 34 is a publicly known technology, proposed by the present applicant, for example, disclosed in WO02/091195, as an interface driver program for an electronic computing machine.

The driverware 34 has an application program interface part 51 for receiving command or data from the application program 33, and sending data to the application program 33. The driverware 34 has a control part 52 for controlling entire operation of the driverware 34. Also, the driverware 34 has a log acquisition part 53 for obtaining operation histories.

The driverware 34 has an encryption part 54 for encrypting data communicating, and a decryption part 55 for decoding encrypted data. The driverware 34 has a device driver control part 60 for controlling the device driver 35. The device driver control part 60 can be created for every device driver 35, or one device driver control part 60 can control a plurality of device drivers 35 in the case exist common functions, etc.

The control part 52 controls and monitors other parts of the driverware 34 such as the device driver control part 60, the application program interface part 51, the log acquisition part 53, the encryption part 54, the decryption part 55, and is the core part of the driverware 34. The device driver control part 60 comprises control parts for controlling each device driver 35.

For example, it comprises a network control part 56 for controlling the network driver 37a, a file system control part 57 for controlling the file system driver 39, a input device control part 59 for controlling a keyboard driver 43a and a mouse driver 44a. A RAM disk control part 58 creates the RAM disk 7, and performs its settings.

In the present embodiment, the device driver 35 is described as attached to the Operating System 30. The network driver 37a is a device driver for controlling the network card 37. The file system driver 39 is for managing information related to files and folders stored in the auxiliary storage device 6, and provides accesses to the files and folders stored in the auxiliary storage device 6.

The file system driver 39 provides access to a storage device, in this example connected to the user terminal 2, compliant with standards IDE (Integrated Drive Electronics), ATA (Advanced Technology Attachment), SATA (Serial ATA), SCSI (Small Computer System Interface), USB (Universal Serial Bus), and derived standards thereof. Since the present disclosure is not an disclosure for hardware standards, the detailed explanation is given to specifications of each standards, and the detailed description is omitted.

In this way, the driverware 34 has the application program interface part 51 for receiving commands and/or data output from the application program 33, and sending the execution results of the commands and/or received data from the device driver 35 to the application program 33. Also, the driverware 34 has a device driver control part 60 for sending these commands and/or data to the device driver 35, and receiving the execution results of the commands from the device driver 35 and/or received data.

Further, the driverware 34 has the control part 52 for performing data controlling by processing these commands and/or data, and by outputting output data. The driverware 34 has the encryption part 54 for creating encrypted data by encrypting data, and the decryption part 55 for creating the original data by decoding the encrypted data. Further, it has the log acquisition part 53 for obtaining and preserving operation histories of the driverware 34. The log acquisition part 53 obtains and records especially the operation histories of the control part 52.

Each control part 56~59 of the device driver control part 60 is controlled by the control part 52, or receives commands or data from the control part 52, and sends or transfers these to the device driver 35. The device driver control part 60 receives the result which is executed abovementioned command and data from the device driver 35, and sends them to the control part 52. In this way, the driverware 34 is the core part for controlling the user terminal 2, especially controlling operations of each device of the user terminal 2.

[Application Platform Program]

The application platform program 38 (See FIG. 3 and FIG. 4) is an application program operating in the user mode 32 of the Operating System 30. The application platform program 38 is an application program located between the application program 33 and the Operating System 30, for controlling by intermediating sending and receiving commands and data between them.

The application platform program 38 provides a user interface for accessing the file system from the Operating System 30. The application platform program 38 has a function for starting up the application program 33, for monitoring the startup process therewith, and for obtaining attribute information thereof.

Figure 5:
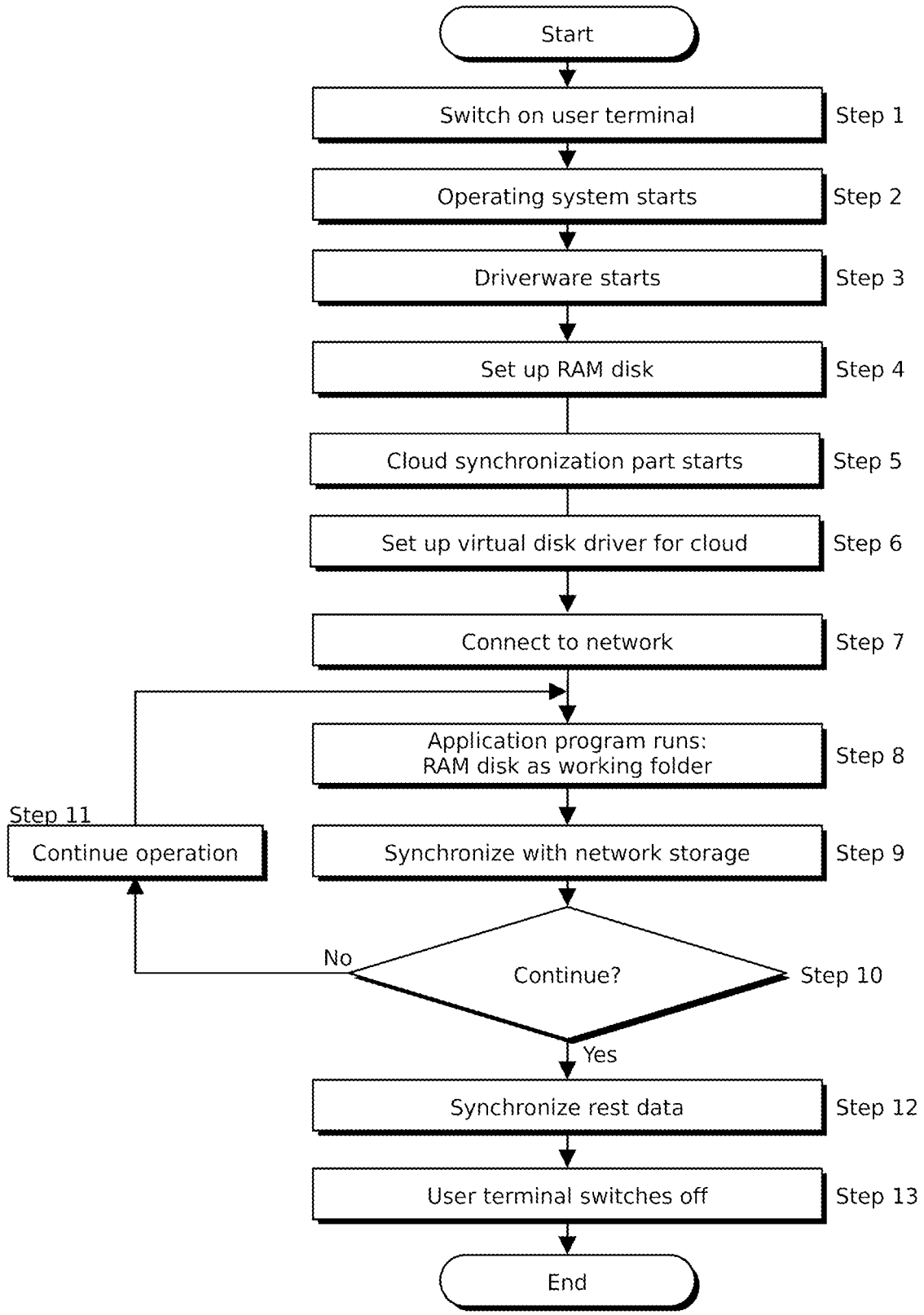
FIG. 5 is a flowchart showing an operation overview of an electronic data management system 1 for electronic computing machine of the first embodiment of the present disclosure.

FIG. 5 is a flowchart showing the operation summary of the user terminal 2 of the electronic data management system 1 for electronic computing machine of the first embodiment of the present disclosure. First, the user terminal 2 is switched on and started up (Step 1). The Operating System 30 of the user terminal 2 starts up, performs an initializing process, etc. then, the driverware 34 starts up (Steps 2, 3).

The RAM disk control part 58 for creating the RAM disk 7 starts up, secures an area for the RAM disk 7 on the main memory 5, and settings for the RAM disk 7 is performed in the Operating System 30 and the driverware 34 (Step 4). An area necessary for the RAM disk 7, in other words, the memory size resident on the main memory 5 is set predetermined to 500 MB, 1 GB, 4 GB, etc. as standard size, but it can be designated by the user during the operation of the RAM disk control part 58, etc.

Since the driverware 34 is controlling the device driver 35, the driverware 34 controls the file system driver 39, etc., and performs setting for the RAM disk 7 as to operate as a main auxiliary storage device. First, the RAM disk 7 is registered to the I/O function of the Operating System 30 as an auxiliary storage device. Also, the RAM disk driver 7a is read and linked with the file system driver 39. This allows that the RAM disk 7 is recognized to the file system driver 39 and the Operating System 30 as a normal auxiliary storage device.

Next, performs formatting process for the RAM disk 7. This allows that it becomes accessible from the application program 33, the Operating System 30, etc. Next, a program of the cloud synchronization part 12 starts up, generates the virtual storage device for cloud 10, and the settings therefor is performed by the Operating System 30 and the driverware 34, etc. (Steps 5, 6). The virtual storage device for cloud 10 is registered to the I/O function of the Operating System 30 as an auxiliary storage device.

Also, the virtual disk driver for cloud 10a is read, and linked to the file system driver 39. This allows that the virtual storage device for cloud 10 is recognized to the file system driver 39 and the Operating System 30 as an auxiliary storage device. This allows, it becomes accessible from the application program 33 and the Operating System 30.

Then, the user terminal 2 connects to the network 4 (See FIG. 1), and connects to the the network storage 3 (Step 7). In other words, the user terminal 2 establishes communication link with the network storage 3. This allows that the preparation for which the user use the user terminal 2 is made. The application program 33 operates on the user terminal 2, and performs data processing, etc. (Step 8).

The application program 33 operates on the user terminal 2. Specifically, it operates by requests or instructions from the user, other application program, or services of the Operating System 30. The application program 33 operates by read from the auxiliary storage device 6 or the network storage 3. When the application program 33 operates, it can access to the network storage 3 which is a virtual disk without substantive, via the virtual storage device for cloud 10.

In the user terminal, the driverware 34 sends contents of the RAM disk 7 to the network storage 3 (See FIG. 1), and the folder 11 for the RAM disk 7 in the network storage 3 synchronizes with the virtual storage device for cloud 10 (Step 9). The user terminal 2 monitors workings periodically, then continues or ends (Steps 10, 11).

When the driverware 34 detects that the application program 33 stored user data in the virtual storage device for cloud 10, notifies it to the cloud synchronization part 12. The cloud synchronization part 12 confirms the content of the RAM disk 7, and ends after synchronizing unsynchronized files immediately with the network storage 3 (Step 12). In other words, remaining data for synchronizing are synchronized. When this synchronization ends, the user terminal 2 switches off. In this time, contents of the main memory 5 are eliminated, therefore, contents of the RAM disk 7 are erased (Step 13).

Therefore, the user data used by the application program 33 does not remain in the user terminal 2, and is erased from the user terminal 2. Therefore, for the user, it becomes that the user data does not remain completely in the user terminal 2, and the information leakage and confidentiality of the user data are ensured.

[Management Program]

Figure 6:
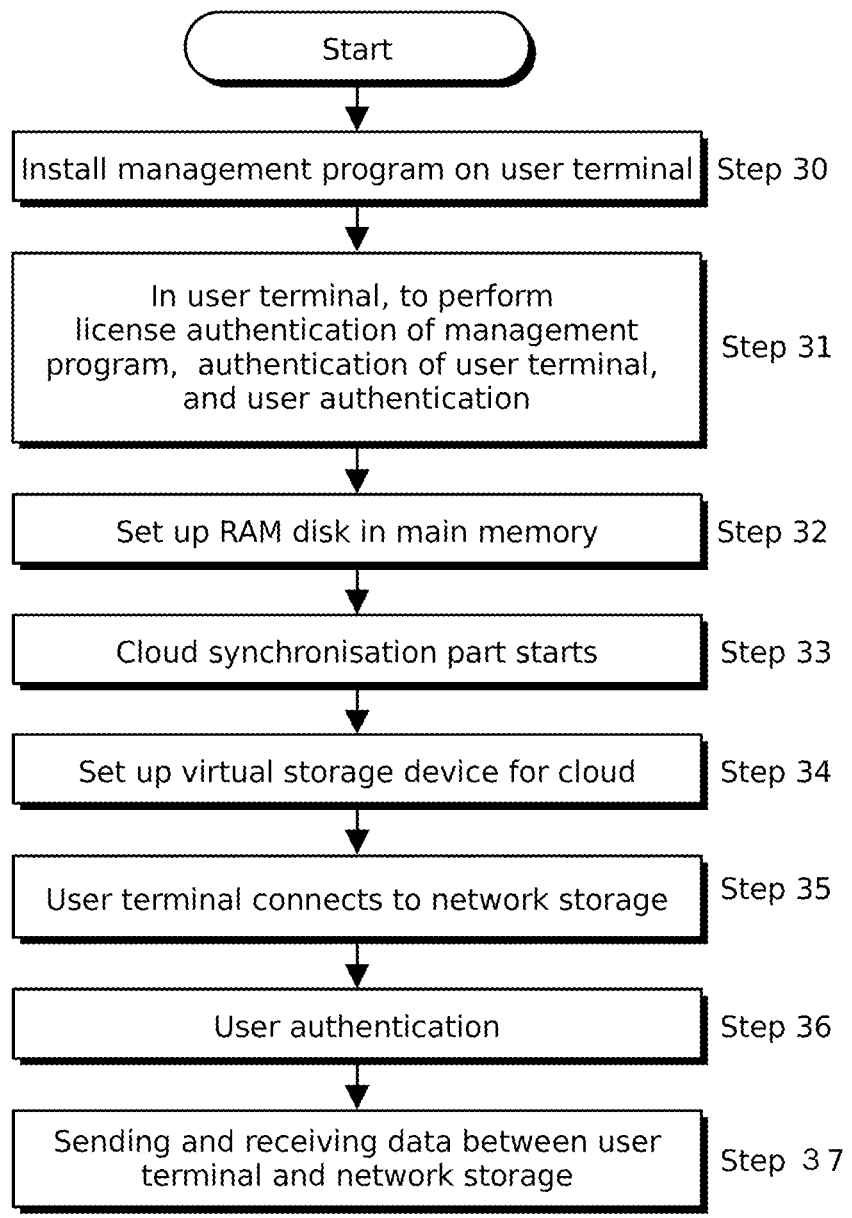
FIG. 6 is a flowchart showing an operation example of a management program in an electronic data management system 1 for electronic computing machine of the first embodiment of the present disclosure.

Hereafter, an example of an operation of a management program is described referencing a flowchart shown in FIG. 6. The driverware 34 is provided with the application platform program 38 and the cloud synchronization part 12 as the management program. The management program is provided by storing in a recording medium, etc.

Also, the management program can be being stored in the network storage 3 on the network 4, or other file servers and application providing sites, and it can be downloaded into the user terminal 2 and installed. Thus, the management program is provided by an arbitrary method. The management program is installed in the user terminal 2 (Step 30), according to specific procedures, a license authentication for the management program, a terminal authentication for the user terminal 2, and a user authentication are performed (Step 31).

After all these authentications successfully completed, the user terminal 2 ready to be used. In this time, in the user terminal 2, the RAM disk 7 is set up in the main memory 5 (Step 32). The setting of the RAM disk 7, in this example, is performed by the RAM disk control part 58 built-in the driverware 34. The method for this setting is described above.

Also, when ends the setting of the RAM disk 7, the cloud synchronization part 12 which is used for synchronizing to the network storage 3 starts up, and the virtual storage device for cloud 10 is set up (Steps 33, 34). The cloud synchronization part 12 is a related program included in the management program. In this time, the virtual storage device for cloud 10 is set up, and registered to the I/O function of the Operating System 30.

Abovementioned settings of the RAM disk 7 and the settings of the virtual storage device for cloud 10 can be performed by arbitrarily order. Once ends these settings, the user terminal 2 is connected to the the network storage 3 by connecting to the network 4 (Step 35), and the user authentication, etc. is performed (Step 36). Once the authentication completed normally, it becomes possible that of sending and storing electronic data, such as files, from the user terminal 2 to the network storage 3, or receiving electronic data from the network storage 3 by connecting the user terminal 2 to the network storage 3 (Step 37).

In other words, it becomes possible that of file uploads or downloads from user terminal 2 to the network storage 3. The license authentication, the terminal authentication, and the user authentication (of the user terminal or the network storage) are publicly known, and the detailed description is omitted. Hereafter described on the base that the status having like this preparation for use.

Figure 7:
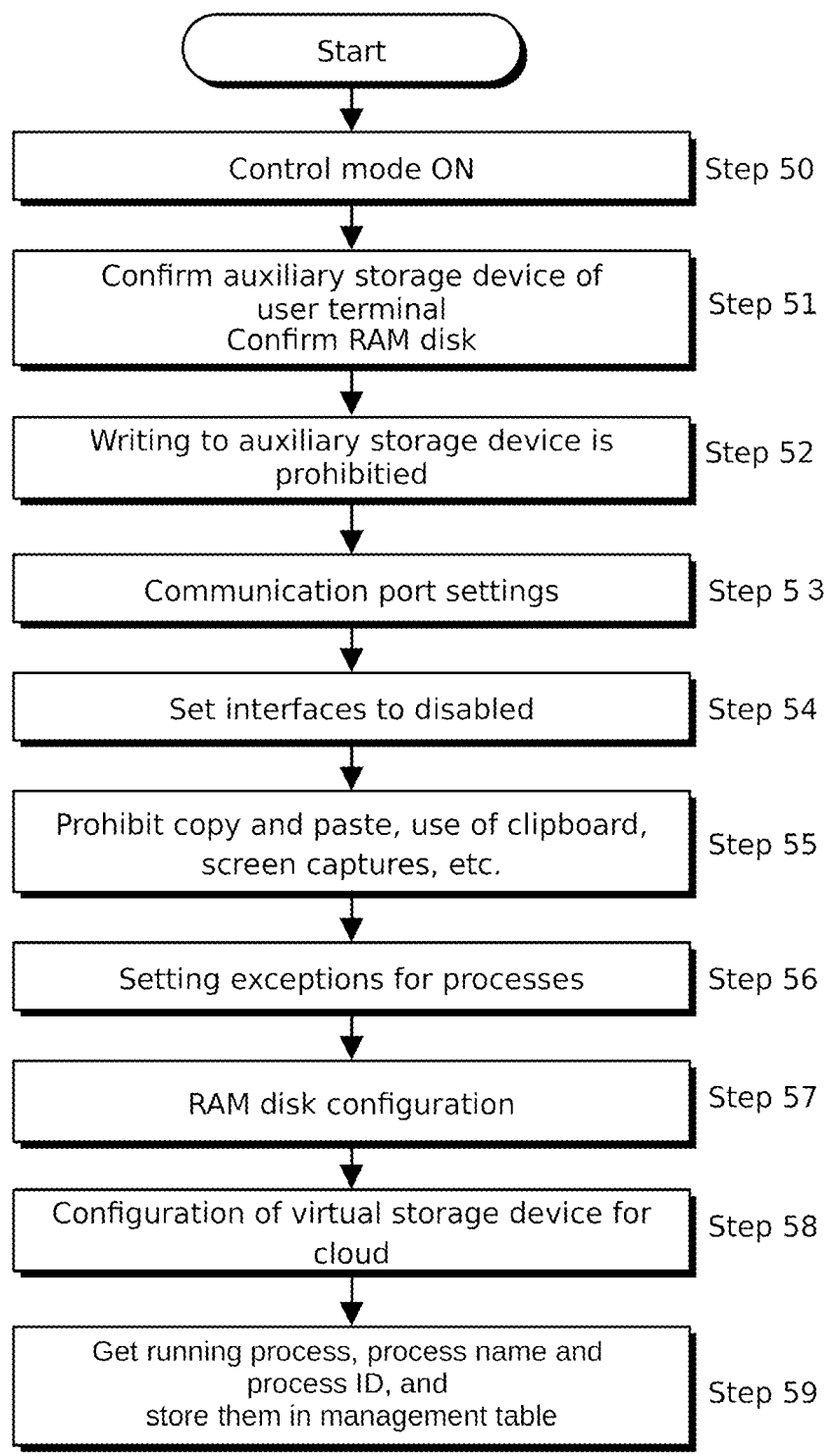
FIG. 7 is a flowchart showing an operation example of a control part 52 of a driverware 34 in an electronic data management system 1 for electronic computing machine of the first embodiment of the present disclosure.

FIG. 7 is a flowchart shown an operation when the management program makes a control mode ON. The management program has the control mode for controlling the electronic computing machine. The control for the electronic computing machine is performed by making the control mode of the management program ON. When the control mode of the management program OFF, the management program installed does not perform the control for the electronic computing machine, and the electronic computing machine operates conventionally.

As shown in FIG. 7, the management program makes the control mode ON after installation (Step 50). In this time, the management program confirms auxiliary storage devices connected to the user terminal 2 (Step 51). Also, confirmations for the RAM disk 7a and the virtual storage device for cloud 10 are performed. In this confirmation, whether the RAM disk 7 and the virtual storage device for cloud 10 is checked among the auxiliary storage devices recognized by the Operating System 30.

Writing into the auxiliary storage devices 6 build-in the user terminal 2 is prohibited (Step 52). In this time, storage devices such as USB memory sticks, removable drives, flexible disk drives, the external auxiliary storage devices 29 (See FIG. 2) are prohibited to write. In other words, restricts data recording into recording means which can be able to take out data from the user terminal 2. For the RAM disk 7 and the virtual storage device for cloud 10, writing to them is not prohibited.

Also, the build-in auxiliary storage device 6 is necessary for an operation of the Operating System 30, and is not subject to access restriction such as writing prohibition. Therefore, when attempting to write data from the application program 33 or the Operating System 30 to the storage devices which are subject to these data recording restriction, the driverware 34 detects them and aborts the writing operation.

The management program performs setting for the communication ports communicating to the network 4 (Step 53). As the communication to the network 4 includes wired or wireless communication, such as the Internet, LAN, via the network card 37, and wired or wireless communication between computers. In this setting, communication ports only necessary for the user terminal 2 are permitted to use, unnecessary ports prohibited to communicate.

This is selectively set by the user, administrator, etc., and when install the management program, or its control mode is set ON, the user can select. Interfaces, other than above-mentioned communication ports, of the user terminal are set to prohibited for use. For example, interfaces using USB, SCSI, IDE, or RS-232C standards are set to prohibited for use (Step 54).

Furthermore, the management program prohibits use of copy & paste, use of clipboard, network functions, and use of screen capture (Step 55). However, if the user, the administrator, etc. wants to use all or a part of these functions, they are not prohibited for use. At last, the management program designates necessary processes for normal operation of the Operating System 30, and sets them as exception (Step 56).

For example, "System" process, etc. necessary for the operation of the Operating System 30 is set as operable. After the management program makes the control mode ON, each setting in Step 51~Step 56 should not be made by this order, but can be combined freely under the circumstance. Once ends these settings, the management program performs configuration of the RAM disk 7 (Step 57).

In the configuration of the RAM disk 7, if a plurality of the RAM disks 7, the main disk is selected and set for use as a working drive, and a working folder, for the virtual storage device for cloud 10, is created or set inside the RAM disk 7. The virtual storage device for cloud 10 was set as the virtual storage device of the network storage 3, for the application program 33, the Operating System 30, etc., a path is only set.

Since by accessing to this path, substantial data is downloaded from the network storage 3, and stored in the RAM disk 7, in the configuration of the RAM disk 7, configures mapping the RAM disk 7 to the virtual storage device for cloud 10. Also, performs various settings for transferring user data stored in the RAM disk 7 to the network storage 3. And performs configuration related to the storage device for cloud 10 (Step 58).

For example, for the user data, sets setting for encryption key for encrypting, timing for transferring (specific time, interval), communication speed, priority, etc., but the administrator can select these settings according to necessity. The management program obtains process names and process IDs of running processes (Step 59). The management program preserves the process names and process IDs obtained in a process control list (See Table 1). In the process control list, as a condition of a file path, its storage destination or a working folder is designated.

In this example, for "Application 1", "e:\" is being set. The storage device for cloud 10 is an image for mounting a network drive of the network storage 3, by allocating it a drive name as like "e:", and the application program 33 accesses to this drive, and can read to and write from any folder freely.

Therefore, the application program 33 starts up, and performs working on the user terminal 2. Therefore, the processed results done by the application program 33 and the Operating System 30, and the user data processed are set so as to store into the storage device for cloud 10, but the substantial data is stored in the RAM disk 7.

The driverware 34 and the cloud synchronization part 12 are always monitoring the RAM disk 7, data for synchronizing with the network storage 3 is encrypted in conjunction with access request which requests to the virtual storage device for cloud 10, and sent finally to the network storage 3. This work continues until that the management program makes the control mode OFF. Once the control mode of the management program is ON, at the same time of the start of the user terminal 2, the management program starts up automatically, and operates with the status of the control mode ON.

It continues unless that the control mode of the management program is set intentionally to OFF. When the control mode of the management program is set to OFF, abovementioned all settings are released.

TABLE 1

| No. | Process name | Process ID | File path condition | Control |
|---|---|---|---|---|
| 1 | System | 8 | *.* | RW |
| 2 | explorer.exe | 1050 | c: \ | RO |
| 3 | Application 1 | 1670 | e:\ | RW |

[Operation of the Control Part]

Figure 8:
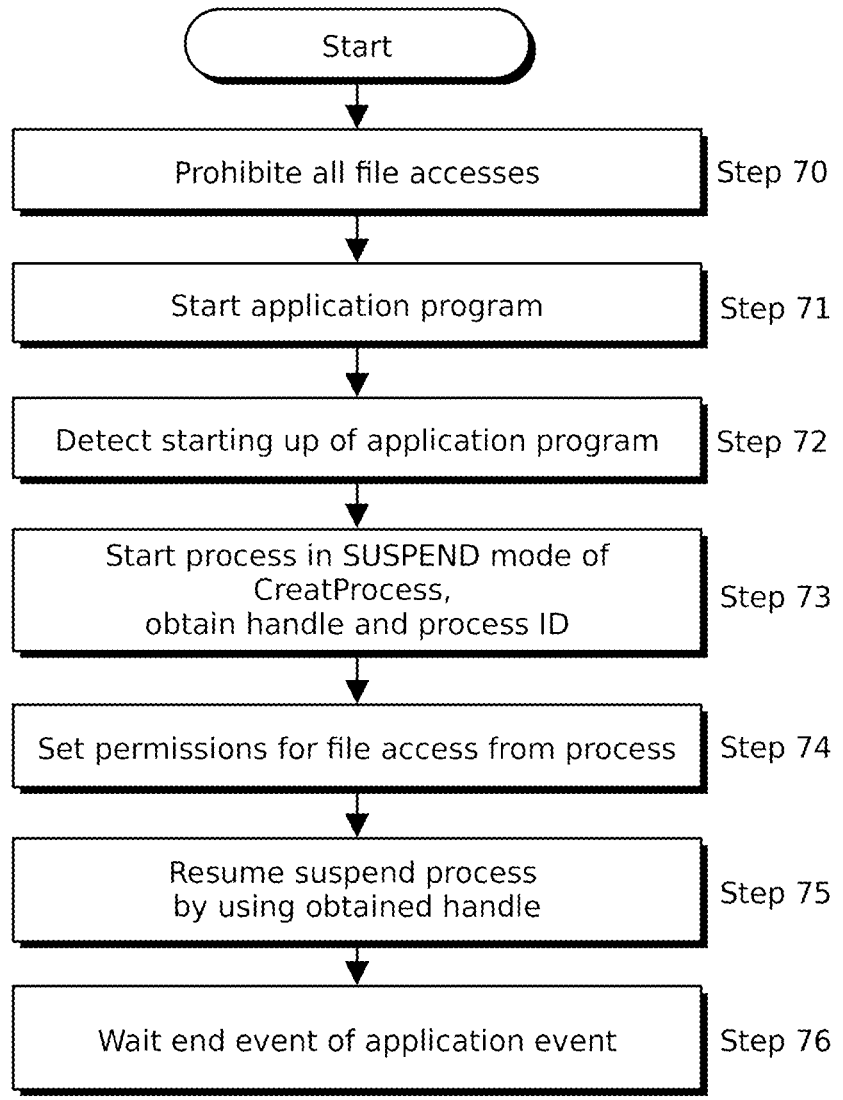
FIG. 8 is a flowchart showing an operation example of a driverware 34 in an electronic data management system 1 for electronic computing machine of the first embodiment of the present disclosure.

A flowchart of an operation of the control part 52 is shown in FIG. 8. When the driverware 34 receives an instruction to set the control mode to ON, the control part 52 receives the instruction, and sends command which prohibit all file accesses (Step 70). This command is sent to the network control part 56, the file system control part 57, the RAM disk control part 58, and the cloud synchronization part 12.

The network control part 56, the file system control part 57, and the RAM disk control part 58 receive the command, and prohibit the file access. Also, perform setting the control process, prohibiting the network use, prohibiting the use of the clipboard, prohibiting the use of the screen capture, prohibiting the copy and paste function, etc. A process manager of the executive 41 (See FIG. 4) manages all processes running.

Here, a startup/end event of the process is obtained by registering a callback function (using API of the kernel 40). For startup/end event of the process running, it sets so as to detect the startup and the end of the application program 33 by setting the callback function. When the application platform program 38 is running, the application program 33 starts up (Step 71).

The application platform program 38 detects the start up of the application program 33 (Step 72). The process of the application program 33 starts with SUSPEND mode of CreateProcess, the application platform program 38 obtains a handle and process ID of this process (Step 73).

When the process starts with suspend mode of CreateProcess, it becomes in temporary pause state, and does not run until resume. The handle is a process handle returned from the CreateProcess. The application platform program 38 sends the handle and the process ID obtained to the control part 52. When the process starts, the callback function inside the file system control part 57 is executed, and notified the control start to the control part 52.

The control part 52 obtains the handle and the process ID. The detailed operation of the obtaining is described below. The control part 52 sends the handle and the process ID to the file system control part 57, references the management table by using the process ID, and performs setting, according to the value of the management table, to allow to access the file access. Contents setting so as to allow the file access are process ID, process name, file name, folder name, and file operations.

The setting designated for the file operation is the setting to allow one of Read Only and Read/Write (Step 74). Once these a series of settings end, by using the obtained handle, the suspend process is restarted (Step 75). The application program 33 is operated. Then, the control part 52 waits the end event which is the notification output from the Operating System 21 when the application program 33 ends (Step 76).

Once the application program 33 ends, the callback function inside the file system control part 57 is executed, and notifies the control release to the control part 52. The file system control part 57 releases the control performed by the process control list (See Table 1), after that do not perform controlling this application program 33. Of course, when this application program 33 accesses user data, the control restarts.

Figure 9:
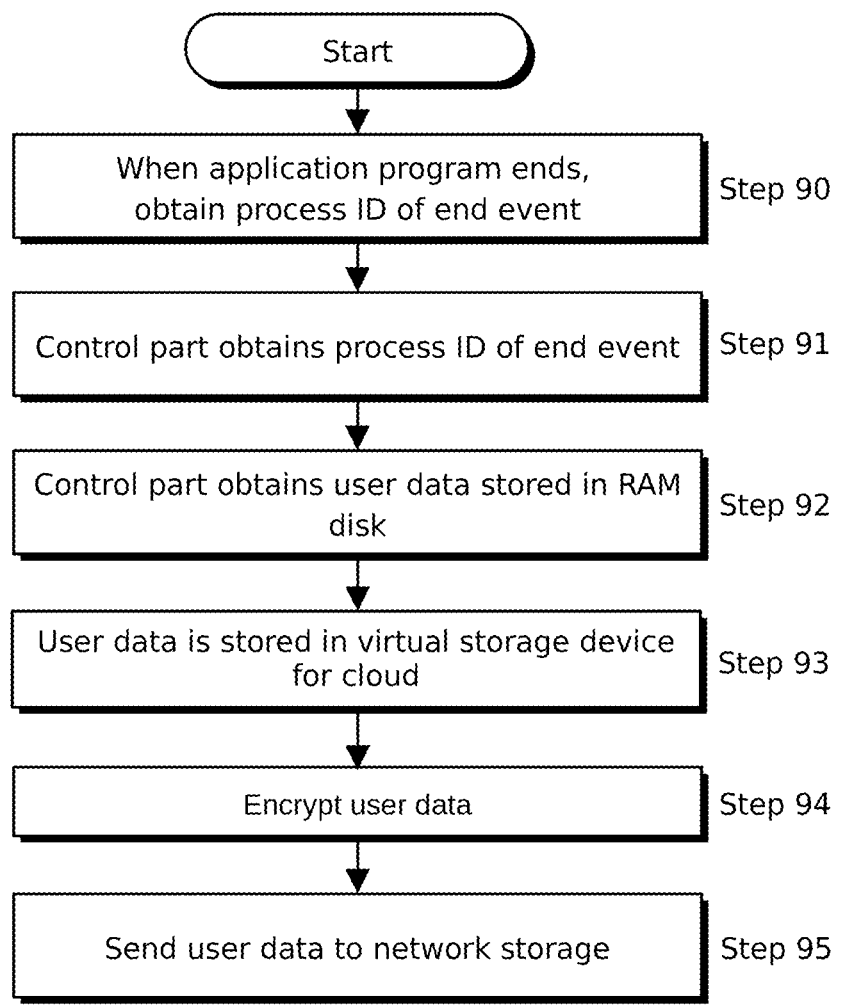
FIG. 9 is a flowchart showing another operation example of a control part 52 of a driverware 34 in an electronic data management system 1 for electronic computing machine of the first embodiment of the present disclosure.

FIG. 9 is showing a flowchart of the operation of the control part 52 when the application program 33 ends. When the application program 33 ends, an end event generates, and the application platform program 38 obtains a process ID of the end event (Step 90). The application platform program 38 sends the process ID of the end event to the control part 52.

The control part 52 obtains the process ID of the end event (Step 91). The control part 52 obtains user data which were being used by the application program 33 stored in the RAM disk 7 (Step 92). The user data is stored in a dedicated folder 8 created for the application program 33. The storage destination is identified by reference to the process control list (See Table 1).

The control part 52 transfers and stores this user data to the virtual storage device for cloud 10 (Step 93). The cloud synchronization part 12 obtains data stored inside the virtual storage device for cloud 10, and encrypts by the encryption part 54 via the control part 52 (Step 94). Then, the encrypted data is sent to the network control part 56, and finally stored in the network storage 3 (Step 95).

In this time, the control part 52 obtains the encrypted user data, and sent finally to the network card 37 via the network control part 56. Since the encryption of the user data, and the transference of the encrypted data to the network driver 37*a* are processed in the kernel mode 31, they are processed at high speed. Then, because it is an operation mode which cannot directly access by other application program, etc., a high level security is ensured. As a result, there is no leakage of the user data to outside.

Thus, the control part 52 detects the application program 34, its event, and outputs an instruction to send user data of the RAM disk 7 to the network storage 3. Relating to the RAM disk 7, the control part 52 can output instructions to send user data to the network storage 3 at any timing such as at which every specific period, when a new application program 33 starts up, when user data is created or changed, when an error occurs in the Operating System 33 or the application program 33, or an error detected.

In the user terminal 2, executable files and processes, which are necessary at least for the operation of the the Operating System 30, are required to be operated without restrictions. For example, as a process can be exemplified System, Kernel.exe, explorer.exe. A control process name and a control directory are registered in the process control list. These process are set as a startup setting of the Operating System 30, in other words, a directory of the auxiliary storage device 6 is set as a working folder.

Therefore, the control part 52 obtains the auxiliary storage device 6 from these system processes, and replaces this to a corresponding folder of the RAM disk 7, in other words, redirects. To obtain a process name, an image path of a running process is obtained by using ZwQueryInformationProcess function, and the process name is obtained from a file name of its executable file exe. To obtain a process ID, an ID of present process is obtained by using PsGetCurrentProcessId( ) function.

To obtain a file name, the file name is obtained using file objects referenced from input/output (I/O) request (IRP) related to I/O request of file. A detection of an event is performed as next. I/O request inside the kernel 31 of the Operating System 30 is performed in the format of IRP (IO Request Packet). Relating to a file access, IRP shown in the next Table 2 is used. Ten event detection is performed by setting the callback function for IRP.

The callback function is registered in the process manager of the executive 41, and when the callback function is executed, the control is transferred to the driverware 34 referencing to.

TABLE 2

List of IRP relating file access:

IRP_MJ_CREATE
IRP_MJ_CREATE_NAMED_PIPE
IRP_MJ_CLOSE
IRP_MJ_READ
IRP_MJ_WRITE
IRP_MJ_QUERY_INFORMATION
IRP_MJ_SET_INFORMATION
IRP_MJ_QUERY_EA
IRP_MJ_SET_EA
IRP_MJ_FLUSH_BUFFERS
IRP_MJ_QUERY_VOLUME_INFORMATION
IRP_MJ_SET_VOLUME_INFORMATION
IRP_MJ_DIRECTORY_CONTROL
IRP_MJ_FILE_SYSTEM_CONTROL

TABLE 2-continued

List of IRP relating file access:

IRP_MJ_DEVICE_CONTROL
IRP_MJ_INTERNAL_DEVICE_CONTROL
IRP_MJ_SHUTDOWN
IRP_MJ_LOCK_CONTROL
IRP_MJ_CLEANUP
IRP_MJ_CREATE_MAILSLOT
IRP_MJ_QUERY_SECURITY
IRP_MJ_SET_SECURITY
IRP_MJ_POWER
IRP_MJ_SYSTEM_CONTROL
IRP_MJ_DEVICE_CHANGE
IRP_MJ_QUERY_QUOTA
IRP_MJ_SET_QUOTA
IRP_MJ_PNP

User data is basically called from the application program 33, and used by deploying in the main memory 5. In the action to call the user data, the application program 33 issues an access request from the virtual storage device for cloud 10. The substantial user data is being stored in the network storage 3, when this request is issued, it is downloaded from the network storage 3, and stored in the RAM disk 7.

Also, when the application program 33 ends its working and stores user data, similarly, a request to store in the virtual storage device for cloud 10 is issued, but the substantial user data is stored in the RAM disk 7 from the main memory 5, furthermore, transferred and uploaded to the network storage 3 from the RAM disk 7. When the upload does not complete, it is retried.

Figure 10:
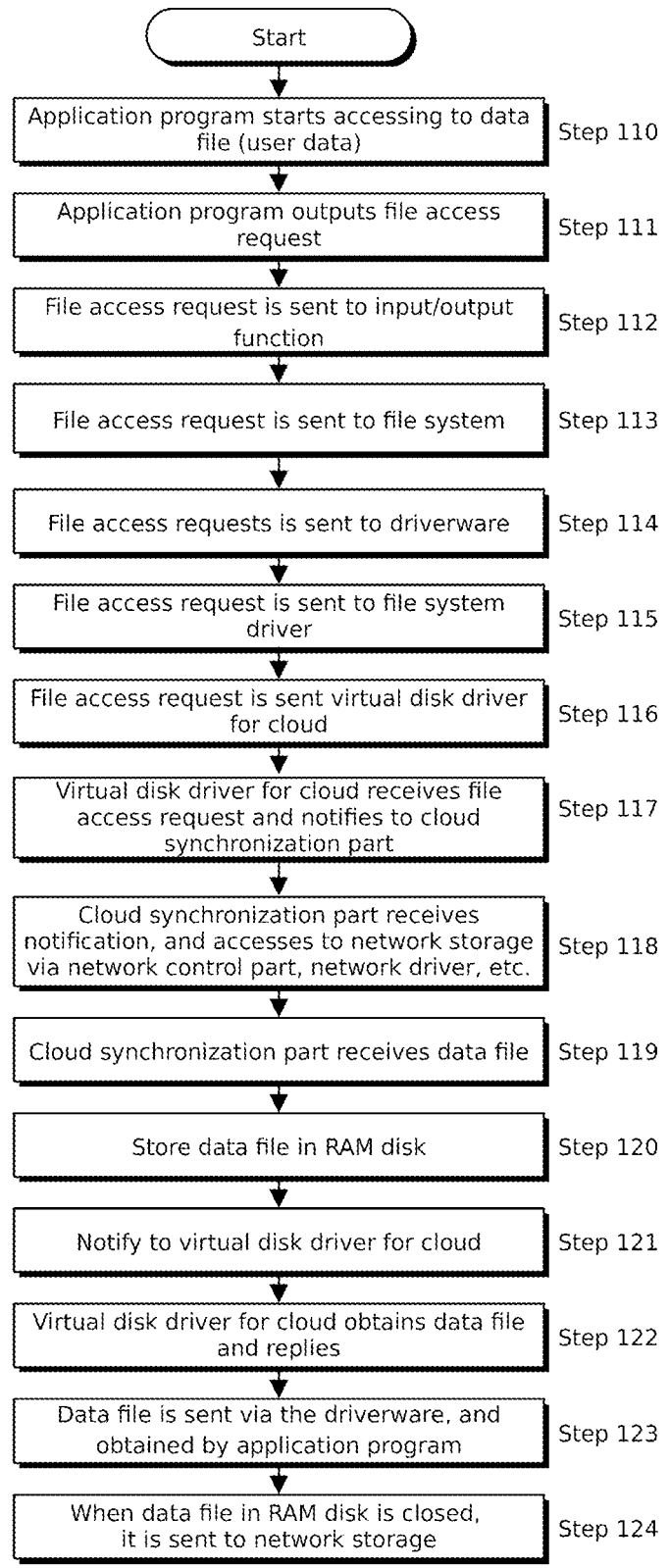
FIG. 10 is an explanatory diagram showing an example flow when using user data in an electronic data management system 1 for electronic computing machine of the first embodiment of the present disclosure.

An example of a flow to use user data by the application program 33 is described in reference to a flowchart shown in FIG. 10. At first, the application program 33 starts an access to a file of user data (Hereafter, reference as "data file") based on the predetermined setting value or an operation of the user (Step 110). The data file is being stored in the network storage 3, more detailed in the folder 11.

Therefore, the application program 33 issues a file access request by using an address comprising an address of the virtual storage device for cloud 10 (folder 11) and a file name of a data file (Step 111). The file access request issued from the application program 33 is sent to the input/output function of the Operating System 30 (Step 112).

The file access request is sent to the file system by the input/output function of the Operating System 30, and sent to the file system driver 39 (Step 113). In the user mode 32 of the Operating System 30, in the application platform program 38, or in the kernel mode 31, the file access request is detected by the driverware 34, and sent to the control part 52 (Step 114).

The file access request is sent to the file system driver 39 (Step 115), and sent to the virtual disk driver for cloud 10a (Step 116). Since the virtual storage device for cloud 10 is being synchronized with the network storage 3, the cloud synchronization part 12 is controlling the synchronization. When the virtual disk driver for cloud 10a receives the file access request, notifies to the cloud synchronization part 12 (Step 117).

The cloud synchronization part 12 accesses the network storage 3 via the network control part 56, the network driver 37a, and the network card 37 (Step 118), obtains the required data file (Step 119), and stores in the RAM disk 7 (Step 120). When the storing ends, the cloud synchronization part 12 notifies to the virtual disk driver for cloud 10a (Step 121).

The virtual disk driver for cloud 10a obtains the required data file from the virtual storage device for cloud 10, and sends the data file to the sender of the file access request (Step 122). The data file is sent to the application program 33 through the RAM disk driver 7a, the file system driver 39, and the driverware 34, and also through the input/output function of the the Operating System 30, and finally the application program 33 obtains the data file, and performs its processing (Step 123).

The file system control part 57 is monitoring update status of the data file inside the RAM disk 7 by the application program 33, when the data file is closed, the data file is sent to the network storage from the RAM disk 7 (Step 124). When the application program 33 accesses to the RAM disk 7, always intermediates the driverware 34, and when the driverware 34 stores the data file into the RAM disk 7, it is encrypted by the encryption part 54.

Also, when to receive the data file from the RAM disk 7, the driverware 34 sends it to the application program 33 after decoding it by the decryption part 55. The user data is uploaded into the network storage 3 from the RAM disk 7, and when the upload is not completed by the communication failure, etc., it is retried. In other words, when the connection between the user terminal 2 and the network storage 3 is recovered and becomes normal, or after the communication failure or after the time uncompleted the upload, retries after waiting specific time.

[Suspend Mode]

When do not use the electronic computing machine in specific time period or more, components, such as the central processing unit (CPU), a display, a HDD, enters temporary paused status by switching off, and may be decrease power consumption. In this time, the content of the main memory which is the working state in the electronic computing machine, is stored in the auxiliary storage device, and becomes the state that the power almost not used. When restart the electronic computing machine, since the working state stored (working data) is read into the main memory, the electronic computing machine can be restart at high speed.

The electronic computing machine, having the state of that the working data, content of the main memory, stored in the auxiliary storage device, is said to be in the suspend mode (Hereafter, refers just "suspend mode" or "suspend function"). Like this suspend mode may be called a sleep, a sleep mode, a temporary pause state, etc. depending on Operating Systems.

As described below, an operation entering to the suspend mode, an operation starts up from the suspend mode, an operation to store working data of these operations in auxiliary storage devices, an operation calling working data from auxiliary storage devices, an operation deleting working data and temporary file in auxiliary storage devices, an operation deleting working data in the RAM disk, and an operation initializing RAM disk are monitored and controlled by abovementioned driverware 34, and the management program, etc. Therefore, about functions of the driverware 34 and the management program is described as the user terminal 2, and the detailed description is omitted.

Figure 11:
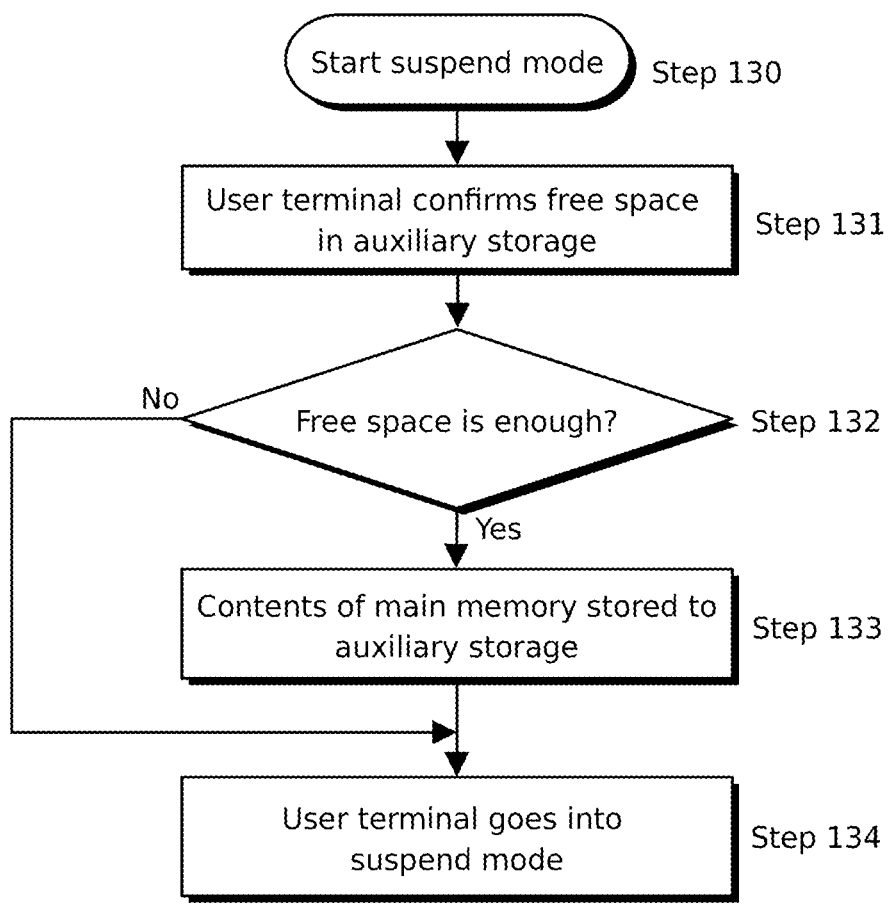
FIG. 11 is a flowchart showing an operation when a user terminal 2 enters into a suspend mode.

FIG. 11 is a flowchart shown an operation which the user terminal 2 enters to a suspend mode. The user terminal 2 has a a power management operation part (on a home window of the Operating System) for operating and instructing the power supply to sleep, shutdown, restart, etc. by user. The user selects the sleep in this power management operation part of the user terminal 2, and by instructing to start a sleep state to the user terminal 2, the suspend mode of the user terminal 2 starts by the instruction of the user (Step 130).

As a note-type electronic computing machine, the suspend mode of the user terminal 2 may starts automatically when close a display, and this can be handled as like the instruction by the user. Also, when a battery state of the user terminal 2 decreases until a level that the user terminal 2 can not continue normal working, in other words, a battery shortage, the Operating System of the user terminal 2 transits automatically to the sleep. Thus, the user terminal 2 starts automatically the suspend mode (Step 130).

The user terminal 2 confirms empty size of the auxiliary storage device 6 (Step 131). The confirmation is performed via the driverware 34 and the file system driver 39, but goes through formally as layer. The main memory 5 does not change basically during the operation of the user terminal 2, and its capacity is fixed when the operation of the user terminal 2 starts, in other words when the operating system starts. Therefore, in setting for the Operating System, a data storage area for sleep is secured on the auxiliary storage device 6.

When enough empty size exists in the auxiliary storage device 6 to store contents of the main memory 5, the contents of the main memory 5 is written and stored in the auxiliary storage device 6 (Steps 132, 133). Therefore, contents of the RAM disk 7, allocating in a part of the main memory 5, is stored without change in the auxiliary storage device 6. The RAM disk 7 is encrypted always by the encryption driver of the driverware 34, therefore when the RAM disk 7 enters to the sleep mode, and is stored with encryption without change in the auxiliary storage device 6.

Since the RAM disk 7 is stored with encryption with out change in the auxiliary storage device 6, confidential data such individual information do not be leaked. When enough empty size does not exists in the auxiliary storage device 6 to store contents of the main memory 5, the user terminal 2 starts the suspend mode without saving working data (Step 134).

Figure 12:
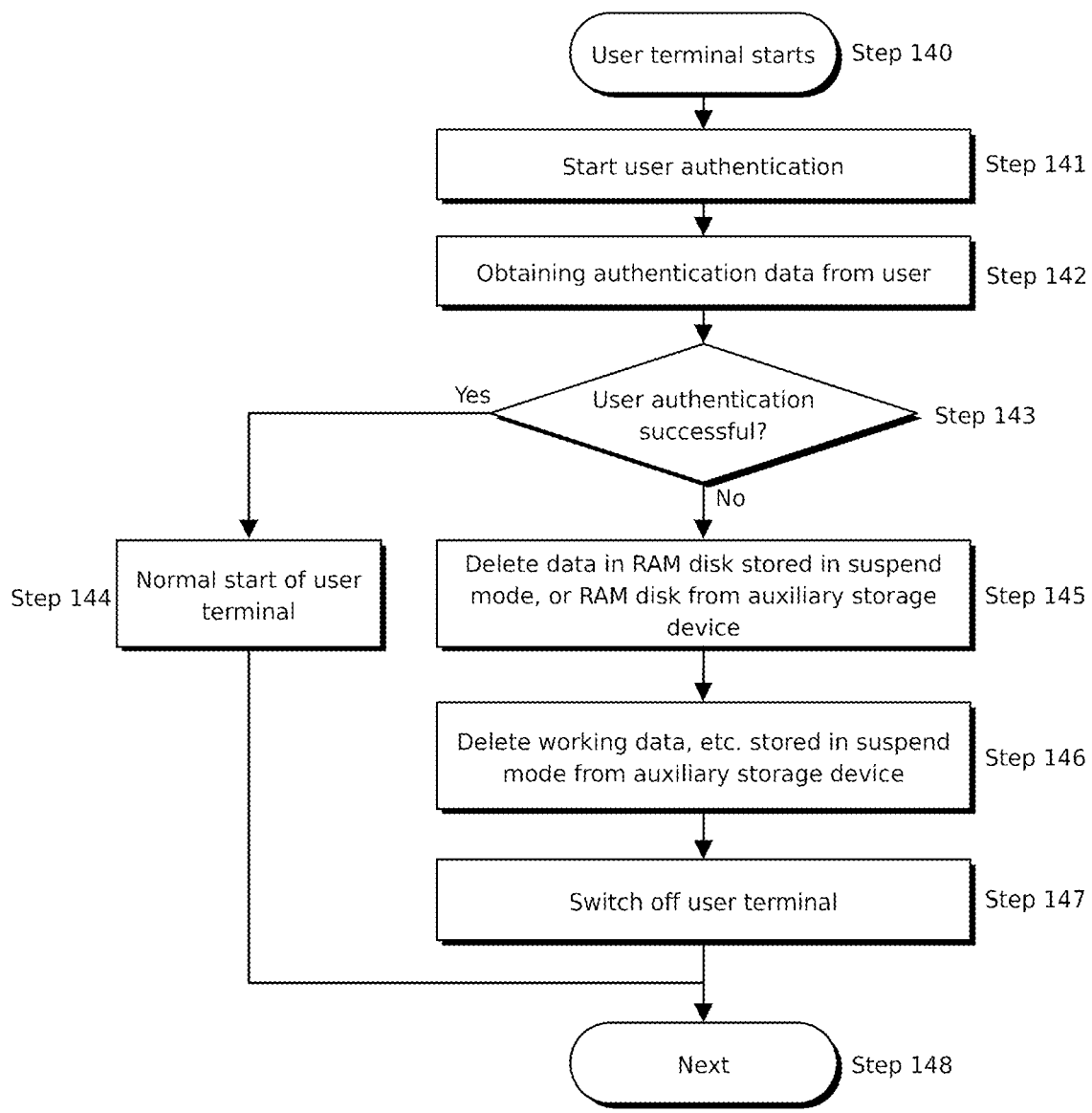
FIG. 12 is a flowchart showing an operation when a user terminal 2 starts up from a suspend state.

FIG. 12 is a flowchart showing an operation when the user terminal 2 starts up from the suspend mode state. The user terminal 2 starts starting up by user operation, automatic setting, etc. (Step 140). When the user terminal 2 starts up, the content data of the main memory 5, stored in the auxiliary storage device 6 in entering to the suspend mode, is read from the auxiliary storage device 6 and deployed in the main memory 5. Therefore, the user terminal 2 is restored the state before entering the suspend mode, but in addition a normal authentication of the Operating System, a personal authentication for accessing to the RAM disk 7 is performed.

An initializing window of the Operating System 30 is displayed, the normal authentication of the Operating System is performed. Then, after starts up the user terminal 2, when the first request to access to the RAM disk 7, the driverware starts the user authentication as trigger this access request (Step 141). The user terminal 2 (driverware) obtains the authentication data for authentication entered by the user, the user authentication is performed (Step 142).

The user authentication uses general-purpose authentication means such as password authentication means, fingerprint authentication means, facial recognition means, server authentication means by authentication server, IC card authentication means, vein authentication means, photometric authentication means, 2 element authentication means. Confirms whether the user authentication completed or not, when completed, the user terminal 2 displays the state before the suspend mode of the user terminal 2 on the display. In other words, the access to the RAM disk 7 is permitted, and the user terminal 2 operates normally (Steps 143, 144). Then, the user terminal 2 performs the next working (Step 149).

If the user authentication is not completed, files inside the RAM disk 7, which stored in entering the suspend mode, or the RAM disk 7 is deleted (Step 145). The same, in the user terminal 2, the working data of the Operating System 30, stored at the suspend function, in other words, a hibernation file (hiberfil.sys) which is other than the RAM disk 7, are deleted from the auxiliary storage device 6 by initialization or users instruction (Step 146).

If the user authentication is not completed, the authentication data necessary for user authentication may be being expired by an authentication mechanism on an authentication server. The reason is that when the user terminal 2 was lost, the user notifies necessary data for authentication to the authentication mechanism to invalid them. Therefore, when in the user terminal 2 which lost tries to login again, the RAM disk 7 and/or the working data stored in the suspend mode is deleted or initialized.

Also, when anybody which is not a legitimate user of the user terminal 2 tries to access, the user data is deleted or initialized. Then, the user terminal 2 is switched off (Step 147), and waits a next operation (Step 148).

Figure 13:
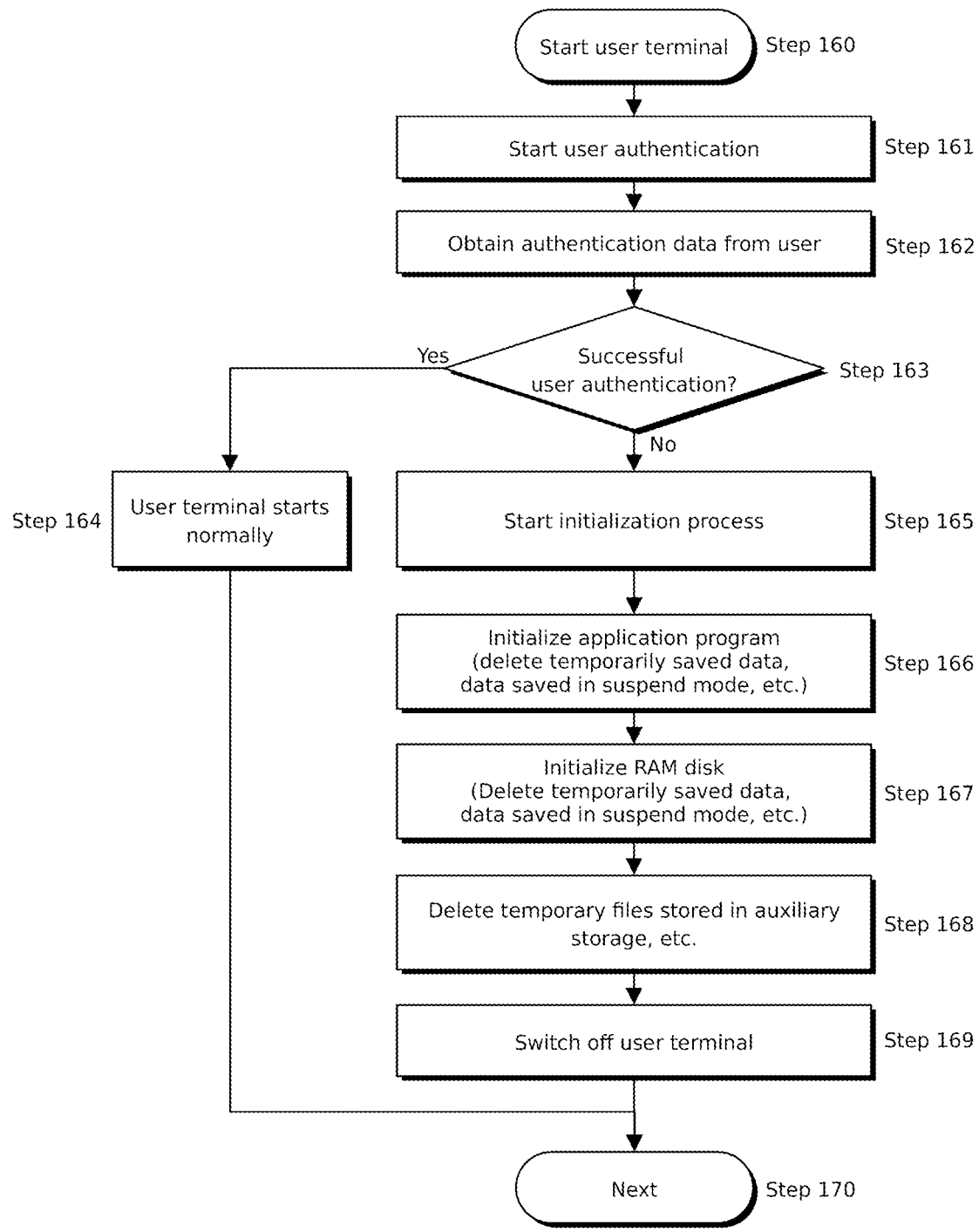
FIG. 13 is a flowchart showing another example of an operation when a user terminal 2 starts up from a suspend state.

FIG. 13 is a flowchart showing an another example of an operation when the user terminal 2 starts up from the suspend mode state. The user terminal 2 starts starting up by user operation, automatic setting, etc. (Step 160). When the user terminal 2 starts up, working data (content of the main memory 5), stored in the auxiliary storage device 6, is read and displayed an initializing window of the Operating system 30 on the display. Then, the user authentication is started (Step 161).

The user terminal 2 obtains the authentication data for authentication entered by the user, the user authentication is performed (Step 162). Confirms whether the user authentication completed or not, when completed, the user terminal 2 displays a state before entering the suspend mode of the user terminal 2 on the display (Steps 163, 164). Then, the user terminal 2 performs a next working (Step 170).

If the user authentication is not completed, the user terminal 2 starts the initializing working (Step 163→Step 165). At first, the application program 33 is initialized (Step 166). For this, the application program 33 of which working data is stored at the suspend function becomes the subject. At the initialization, the temporarily stored data of the application program 33 (which is content of the RAM disk 7, and is temporary stored data, and is data stored in the auxiliary storage device 6 in the suspend) is deleted.

Also, if the working data of the application program 33 stored at the suspend function exist in the auxiliary storage device 6, the user terminal 2 deletes them. When the user authentication is not completed, the user terminal 2 may be being lost or having an illegal access, for securing the user data, especially confidential data, the user terminal 2, also including the RAM disk 7, is initialized automatically. The user terminal 2 performs the initializing for the RAM disk 7 (Step 167). In this time, if the temporary stored data of the RAM disk 7 exists in the auxiliary storage device 6, the user terminal 2 deletes them.

Also, if data of the RAM disk 7 stored in entering the suspend function, or related data thereof exist in the auxiliary storage device 6, the user terminal 2 deletes them. Then, the temporary file stored in the auxiliary storage device 6 is deleted (Step 168). At last, the user terminal 2 switches off (Step 169). Then, the user waits the next operation such as restart the user terminal 2 (Step 170).

Figure 14:
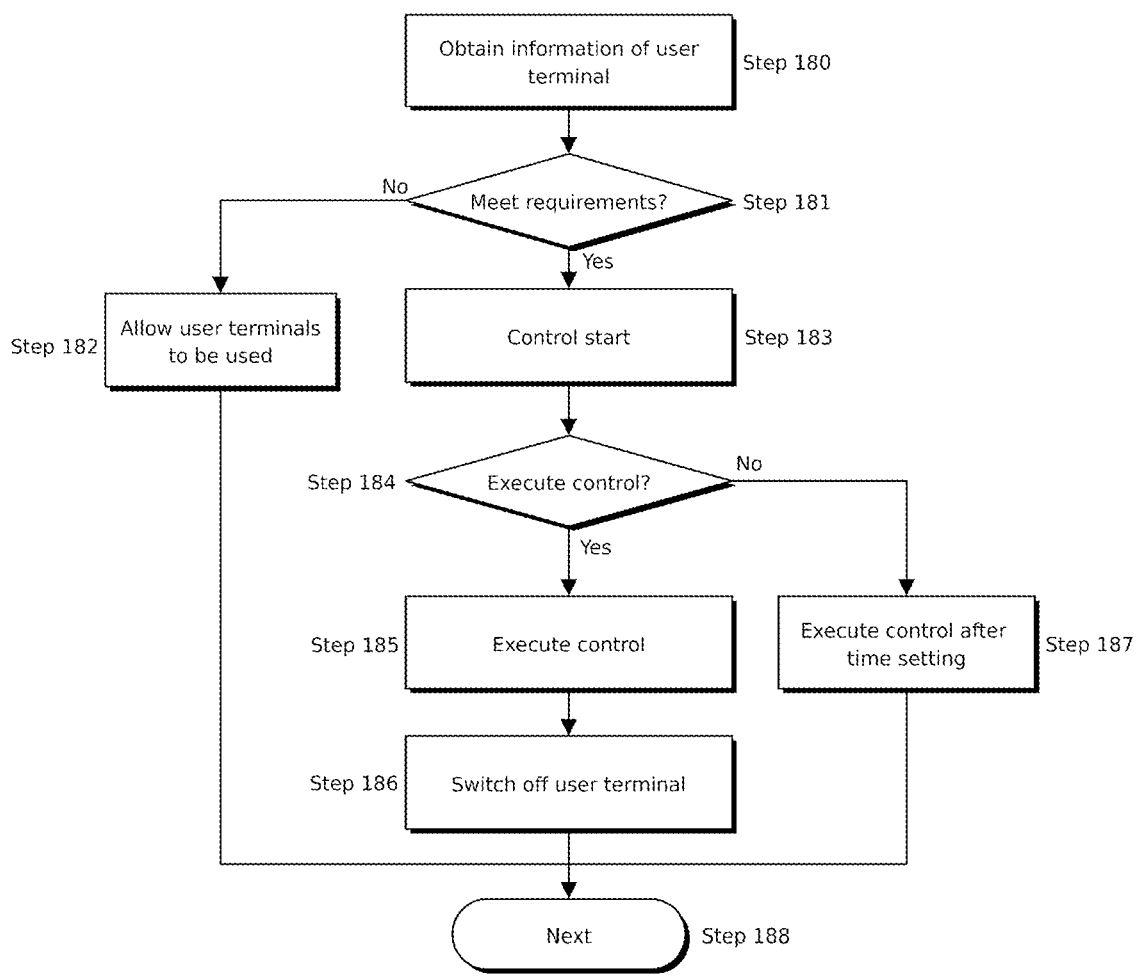
FIG. 14 is a flowchart showing a procedure controlling data when a user terminal 2 meets certain conditions.

FIG. 14 is a flowchart showing a procedure controlling data when the user terminal 2 meets certain conditions. In this control includes deleting working data of the application program 33, deleting working data of the Operating System 30, initializing the RAM disk 7, etc. The condition to control is based on a time table information in Table 2. 1st column of Table 2 indicates orders, 2nd column indicates control contents, 3rd column indicates condition of the control contents, and 4th column indicates type of control when meets the condition respectively.

The driverware 34 and abovementioned management program monitor a location information of the user terminal 2 by obtaining them from a location information means integrated on the user terminal 2. In this monitoring, performs the control which meet with the location information in the control contents of Table 2. As the location information means can be use a wireless communication means for communicating to a mobile communication base station, a location information device for obtaining location information from Global Positioning System, or a communication device for obtaining IP addresses from a communication network such as the Internet.

For example, in the location information shown in the control content in Table 3, the location information device determines location information obtained from the Global Positioning System as like that whether its condition is within a predetermined permit range or outside the range, and a control shown by a control type is performed (See number 1, 2 in Table 3). The permit range means predetermined region range, or location. In case of time zone shown in the control content in Table 3, the driverware 34 and the abovementioned management program monitor time information by obtaining it from a time information means.

As the time information means uses clock means, the abovementioned wireless communication means, a location information device, communication devices, etc. integrated on the user terminal. The location information is determined as like that whether its condition is within the predetermined permit range or outside the permit range, and the control shown by the control type is performed (See numbers 3, 4 in Table 3). This is effective for the purpose of when the user terminal 2 is used only in the permitted time zone. The outside the permit range of the time zone is, for example, midnight, outside working hours, during a break, getting a rest, etc.

This can be used when to manage labor management or confidential information, etc. by setting access time zone for them. Also, the time zone information can be controlled together with adding authentication information of user (See numbers 5~8 in Table 3). As show in numbers 9, 10 in Table 3, it can be controlled by using the authentication device. The authentication device is communicating with the user terminal 2, the condition is determined whether the authentication device and the user terminal 2 are located at predetermined distance or not, and the control shown by the control type is performed.

TABLE 3

| No | Control content | Condition | Control type |
|---|---|---|---|
| 1 | Location information | Within permit range | Permit to use |
| 2 | Location information | Outside permit range | Delete working data Initialize user terminal |
| 3 | Time zone | Within permit range | Permit to use |
| 4 | Time zone | Outside permit range | Delete working data Initialize user terminal |
| 5 | Time zone | 1st time zone | Stop to use user terminal |
| 6 | Time zone | 2nd time zone | Delete working data |

TABLE 3-continued

| No | Control content | Condition | Control type |
|---|---|---|---|
| 7 | Time zone | 1st time zone, authentification failure | Initialize user terminal In 2nd time zone, Delete working data Initialize user terminal |
| 8 | Time zone | 2nd time zone, authentification failure | Delete working data Initialize user terminal |
| 9 | Authentication device | Within permit range from user terminal | Permit to use |
| 10 | Authentication device | Outside permit range from user terminal | Delete working data Initialize user terminal |

As abovementioned control procedure is described referencing to FIG. 14 and Table 3. The driverware 34 and the abovementioned management program obtain information of the user terminal 2 (Step 180). In the information obtaining, the location information is obtained from the abovementioned location information means, and time information is obtained from abovementioned time information means. If the location information means is built-in the user terminal 2, it is obtained from the interface via the device driver 35 (See FIG. 3).

When as like the Global Positioning Information System, wireless communication means, etc. are locates outside the user terminal 2, the information are obtained from the interface of the device, built-in or externally attached to the user terminal 2, communicating with these location information means via the device driver 35. In the case of the authentication device, the information are obtained from the interface of the device, built-in or externally attached to the user terminal 2, communicating with these location information means via the device driver 35.

The information obtained like this is confirmed and determined whether it meets the conditions shown in Table 3 or not (Step 181). If it does not meet the conditions, the user terminal 2 is basically permitted to use without restriction (Step 182). If it meets the conditions, the control starts, but it is determined whether the control is executed immediately or not (Step 181→Steps 183, 184). In this time it is decided by whether time for synchronizing the data of the RAM disk 7 with the network storage 3 is necessary or not, or by whether any obstacle for the application program 33, etc.

When the control execution is performed immediately, the control shown by the control type is performed (Step 185). The control shown by the control type in Table 3 is performed. Since the control shown by the control type is the same abovementioned FIG. 12 and FIG. 13 and its description, the detailed is omitted. If the execution of the control ends, the user terminal 2 switched off (Step 186). When the control execution is not performed immediately, the control for setting time is executed (Step 187). In this time, the driverware 34 calculates end time of the execution of data synchronization and the application program, the setting time is decided by setting the end time.

Or, the driverware 34 monitors the end of the execution of the data synchronization and the application program, after the end, the execution of the control can be performed. 1st time zone and 2nd time zone shown in Table 3 can be set arbitrary. For example, 1st time zone is set as working hour as "09 h00 min00 sec~17 h00 min00 sec", "09 h00 min00 sec~12 h00 min00 sec and 13 h00 min00 sec~17 h00 min00 sec", etc., and a weekday, a work permit date, etc. can be combined with them. Also, it can be short time as like "09 h00 min00 sec~09 h30 min00 sec".

2nd time zone can be set as like "17 h00 min00 sec~09 h00 min00 sec", "24 h00 min00 sec~06 h00 min00 sec", etc., outside the 1st time zone, a night time, etc. Also, it can be set basically any period or time zones, not preferable for using the user terminal 2, such as rest days and holidays of the calendar, user's break time, user's rest days, business trip date. 1st time zone and 2nd time zone are examples, but administrators can be set arbitrary.

The authentication device is a device for identification that can be communicate wirelessly or wired with the user terminal 2, for example, can be exemplify a cell phone, a clock type device, a pen type device, a USB key stick, a smartphone, a smart watch, etc. By communicating these devices with the user terminal 2 using identification number, etc., encrypted basically, the authentication device is determined whether it is connected to the user terminal 2 or exists near it.

The authentication between the authentication device and the user terminal 2 can be used 1 level authentication using 1 identification number, or 2 level authentication which 2 element authentication using 2 identification number. About the use of the authentication device is written in detail in (Japanese) Patent application Tokugan 2015-138336, filed by the present applicant, this content is included in the present disclosure.

INDUSTRIAL APPLICABILITY

The present disclosure can be preferably used in areas where required strict management for electronic data. Especially, it can be used preferably in areas required high-level data management, for example, computer leasing businesses, printing industry, insurance company, distributors, financial institutions, nuclear-related facilities, terminals handling personal data, etc.

What is claimed is:

1. An electronic data management device, comprising an electronic computing machine communicating with a network storage which is a storage means on said network providing communication with each other, wherein said electronic computing machine comprising:
    a central processing means for processing data in accordance with program code;
    a main memory means for keeping said program code, or said program code and said data;
    a non-volatile auxiliary storage means for content data of said main memory means when said program code and said electronic computing machine paused;
    an input means for entering instruction command or said data;
    an output means for outputting a result of said processing to outside; and
    a network connection means for connecting said network;
    wherein said electronic computing machine is further comprising an electronic data leak prevention function for preventing and controlling leaking a user data outside, when said user data operated by one or more operation selected from among browsing, editing, and changing, wherein said one or more operation is made by a application program, or, by input data inserted from said input means, wherein said user data comprising said application program operating on said electronic computing machine or an electronic data used by a user; and
    wherein said electronic data management device is further comprising:
        a virtual storage means driver allocated to said network storage;
        a volatile memory means having function as a pseudo auxiliary storage means which is memory-resident in said main memory means, and virtual said auxiliary storage means;
        a control means for obtaining said user data storage destination when said application program opens said user data, and for storing said user data in said volatile memory means, and for obtaining said user data from said volatile memory means when said user data is closed and stored, and for storing said user data via said virtual storage means driver;
        an encryption means for encrypting said user data when said user data is stored in said volatile memory means; and
        a decoding means for decoding said user data encrypted when said user data provided from said volatile memory means to said application program.

2. The electronic data management device according to claim 1, wherein said storage destination is said network storage, and said electronic computing machine comprises a cloud synchronization means for synchronizing said user data of said volatile memory means with said user data of said network storage via said virtual storage means driver.

3. The electronic data management device according to claim 2, wherein said electronic computing machine comprises a driverware means which operates in a kernel mode, configured to execute all commands provided by an operating system which make said electronic computing machine operating, and for providing a common interface for communication between device drivers for directly controlling devices connected said electronic computing machine, or for communication between said devices and said application program driver operating on said electronic computing machine;
    said driverware means comprises a virtual storage means driver which is said device driver for controlling said virtual storage means driver, and a file system control part a volatile memory means driver which is said device driver for controlling said volatile memory means via a file system driver controlling output of said operating system; and
    said file system control part obtains an operation which said application program opens said user data from said virtual storage means driver, obtains said user data from said cloud synchronization means, and stores said user data in said volatile memory means by sending to said volatile memory means via said volatile memory means driver.

4. The electronic data management device according to claim 3, wherein said electronic data management device performs authentication by an authentication means, confirming authenticity for user of said electronic computing machine, when switch off by a suspend function to standby said electronic computing machine; and
    said electronic data management device comprises a data deletion means for deleting data stored by said suspend function just before switched off and/or data stored by said suspend function, when the authentication is not successful.

5. The electronic data management device according to claim 3, wherein said electronic data management device stores data working in said auxiliary storage means when before the end of operation of said electronic computing machine, and switched off by a suspend function which said electronic computing machine standby, and performs authentication by an authentication means, confirming authenticity for user of said electronic computing machine, when to restart; and said electronic data management device comprises an initialization means for performing initializing, when the authentication is not successful, one or more means selected a group of said data management device, said application program, said virtual disk, said virtual storage means driver, and said volatile memory means.

6. The electronic data management device according to claim 4, wherein said authentication means is one or more authentication means selected from a group of password authentication means, fingerprint authentication means, facial recognition means, server authentication means by authentication server, IC card authentication means, vein authentication means, photometric authentication means and 2 element authentication means.

7. The electronic data management device according to claim 4, wherein said data deletion means is executed based on information of a time table indicating a time zone for execution.

8. The electronic data management device according to claim 7, wherein said data deletion means becomes invalid when said electronic data management device located in a region range, permitted based on location information by a mobile communication base station or global navigation satellite system (GNSS); and said data deletion means is executed when said electronic data management device located outside said region range.

9. The electronic data management device according to claim 7, wherein said data deletion means is executed when said electronic data management device can not communicate with said authentication means.

10. The electronic data management device according to claim 7, wherein said data deletion means is executed when time information which said electronic data management device obtained from a time information means is out of setting time.

11. An electronic data management system, comprising an electronic computing machine comprising a network providing communication with each other;

a network storage which is a storage means on said network; and
    said electronic computing machine communicating with said network storage;
    wherein said electronic computing machine comprising:
    a central processing means for processing data in accordance with program code;
    a main memory means for keeping said program code, or said program code and said data;
    a non-volatile auxiliary storage means for content data of said main memory means when said program code and said electronic computing machine paused;
    an input means for entering instruction command or said data;
    an output means for outputting a result of said processing to outside; and
    a network connection means for connecting said network;
    wherein said electronic computing machine is comprising an electronic data leak prevention function for preventing and controlling leaking a user data outside, when said user data is browsed or edited or changed by a application program, or, by input data inserted from said input means, wherein said user data comprising said application program operating on said electronic computing machine or an electronic data used by a user; and wherein said electronic computing machine further comprising:

a virtual storage means driver allocated to said network storage;
    a volatile memory means having function as a pseudo auxiliary storage means which is memory-resident in said main memory means, and virtual said auxiliary storage means;
    a control means for obtaining said user data storage destination when said application program opens said user data, and for storing said user data in said volatile memory means, and for obtaining said user data from said volatile memory means when said user data is closed and stored, and for storing said user data via said virtual storage means driver;
    an encryption means for encrypting said user data when said user data is stored in said volatile memory means; and
    a decoding means for decoding said encrypted user data, when provided said user data from said volatile memory means to said application program.

12. The electronic data management system according to claim 11, wherein said storage destination is said network storage, and said electronic computing machine comprises a cloud synchronization means for synchronizing said user data of said volatile memory means with said user data of said network storage via said virtual storage means driver.

13. The electronic data management system according to claim 12, wherein said electronic computing machine comprises a driverware means which operates in a kernel mode, configured to execute all commands provided by an operating system which make said electronic computing machine operating, and for providing a common interface for communication between device drivers for directly controlling devices connected said electronic computing machine, or for communication between said devices and said application program driver operating on said electronic computing machine;

said driverware means comprises a virtual storage means driver which is said device driver for controlling said virtual storage means driver, and a file system control part a volatile memory means driver which is said device driver for controlling said volatile memory means via a file system driver controlling said operating system; and
    said file system control part obtains an operation which said application program opens said user data from said virtual storage means driver, obtains said user data from said cloud synchronization means, and stores said user data in said volatile memory means by sending to said volatile memory means via said volatile memory means driver.

14. The electronic data management system according to claim 13, wherein said electronic data management device performs authentication by an authentication means, confirming authenticity for user of said electronic computing machine, when switch off by a suspend function to standby said electronic computing machine; and said electronic data management device comprises a data deletion means for deleting data stored by said suspend function just before switched off and/or data stored by said suspend function, when the authentication is not successful.

15. The electronic data management system according to claim 13, wherein said electronic data management device stores data working in said auxiliary storage means when before the end of operation of said electronic computing machine, and switched off by a suspend function which said electronic computing machine standby, and performs authentication by an authentication means, confirming authenticity for user of said electronic computing machine, when to restart; and
said electronic data management device comprises an initialization means for performing initializing, when the authentication is not successful, one or more means selected a group of said data management device, application program, said virtual disk, said virtual storage means driver, and volatile memory means.

16. The electronic data management system according to claim 14, wherein said authentication means is one or more authentication means selected from a group of password authentication means, fingerprint authentication means, facial recognition means, server authentication means by authentication server, IC card authentication means, vein authentication means, photometric authentication means and 2 element authentication means.

17. The electronic data management system according to claim 14, wherein said data deletion means is executed based on information of a time table indicating a time zone for execution.

18. The electronic data management system according to claim 17, wherein said data deletion means becomes invalid when said electronic data management device located in a region range, permitted based on location information by a mobile communication base station or global navigation satellite system; and
said data deletion means is executed when said electronic data management device located outside said region range.

19. The electronic data management system according to claim 17, wherein said data deletion means is executed when said electronic data management device can not communicate with said authentication means.

20. The electronic data management system according to claim 17, wherein said data deletion means is executed when time information which said electronic data management device obtained from a time information means is out of setting time.

21. A non-transitory computer-readable recording medium recording a program for an electronic data management device, wherein said electronic data management device comprises an electronic computing machine communicating with a network storage which is a storage means on a network providing communication with each other,
wherein said electronic computing machine is comprising:
a central processing means for processing data in accordance with program code;
a main memory means for keeping said program code, or said program code and said data;
a non-volatile auxiliary storage means for content data of said main memory means when said program code and said electronic computing machine paused;
an input means for entering instruction command or said data;
an output means for outputting a result of said processing to outside; and
a network connection means for connecting said network;
wherein said electronic computing machine is having an electronic data leak prevention function for preventing and controlling leaking a user data outside, when said user data is browsed or edited or changed by an application program, or, by input data inserted from said input means, wherein said user data is comprising said application program operating on said electronic computing machine or an electronic data used by a user;
wherein said program for electronic data management device for causing in said electronic data management device to execute steps of:
a step generating a virtual storage means driver allocated to said network storage;
a step controlling said virtual storage means driver;
a step generating a volatile memory means having function as a pseudo auxiliary storage means which is memory-resident in said main memory means, and virtual said auxiliary storage means;
a step obtaining said user data from storage destination when said application program opens said user data;
a step storing said obtained said user data in said volatile memory means;
a step obtaining said user data from said volatile memory means when said user data is closed and stored;
a control step for storing said obtained user data by control means said via said virtual storage means driver;
a step encrypting by an encryption means when said user data is stored in said volatile memory means; and
a step decoding said encrypted user data by a decoding means when said user data is provided from said volatile memory means to said application program.

22. The non-transitory computer-readable recording medium according to claim 21, wherein said electronic computing machine comprises a driverware, comprising:
an application program interface part for causing said electronic computing machine to execute a function for receiving first data including a command and/or data output from said application program, and for sending second data including execution result of said command and/or received data received from said device driver to said application program,
a device driver control part for causing said electronic computing machine to execute a function for sending third data including said command and/or said data to said device driver, and for receiving fourth data execution result of said command and/or said received data from said device driver,
a control part for causing said electronic computing machine to execute a function for performing a control of said first data to fourth data by generating said second data or said third data by processing said first data or said fourth data, and
an encryption part for causing said electronic computing machine to execute a function for generating encrypted data by encrypting data, and an decryption part for causing said electronic computing machine to execute a function for generating said original data by decoding said encrypted data;
said driverware operates in a kernel mode, configured to execute all commands provided by an operating system which make said electronic computing machine operating, and provides a common interface for communication between device drivers for directly controlling devices connected said electronic computing machine, or for communication between said devices and said application program driver operating on said electronic computing machine;

said device driver control part comprises a virtual storage means driver which is said device driver for controlling said virtual storage means driver, and a file system control part a volatile memory means driver which is said device driver for controlling said volatile memory means via a file system driver controlling output of said operating system; and said file system control part is preferably causing said electronic data management device to execute steps of:

a step for obtaining an operation to open said user data by said application program from said virtual storage means driver, a step for obtaining said user data from said cloud synchronization means, a step for sending said user data, which is obtained, via said volatile memory means driver to said volatile memory means, and a step for storing said user data, which is sent, to said volatile memory means.

23. The non-transitory computer-readable recording medium according to claim 22, wherein said storage destination is said network storage, and said program for electronic data management device comprises a cloud synchronization program for causing said electronic data management device to execute an function for synchronizing said user data of said volatile memory means with said network storage via said virtual storage means driver.

24. The non-transitory computer-readable recording medium according to claim 22, wherein said program for electronic data management device for causing said electronic data management device to execute steps of:

a suspend step for switching off said electronic data management device by a suspend function to standby said electronic computing machine, a suspend authentication step for authenticating by an authentication means for confirming authenticity for user of said electronic computing machine, when said electronic data management device restarts after switched off, and a data deletion step for deleting data stored by said suspend function just before switched off and/or data stored by said suspend function, when the authentication is not successful.

25. The non-transitory computer-readable recording medium according to claim 22, wherein said program for electronic data management device for causing said electronic data management device to execute steps of:

a suspend step for switching off said electronic data management device by a suspend function which stores working data in auxiliary storage means when operation of said electronic computing machine ends, a suspend authentication step for authenticating by an authentication means for confirming authenticity for user of said electronic computing machine, when said electronic data management device restarts after switched off, and an initialization step for performing initializing, when the authentication is not successful, one or more means selected a group of said data management device, application program, said virtual disk, said virtual storage means driver, and volatile memory means.

26. The non-transitory computer-readable recording medium according to claim 24, wherein said program for electronic data management device for causing said electronic data management device to execute an authentication step for authenticating by one or more authentication means selected from a group of password authentication means, fingerprint authentication means, facial recognition means, server authentication means by authentication server, IC card authentication means, vein authentication means, photometric authentication means and 2 element authentication means.

27. The non-transitory computer-readable recording medium according to claim 24, wherein said program for electronic data management device for causing said electronic data management device to execute said data deletion step based on information of a time table indicating a time zone for execution.

28. The non-transitory computer-readable recording medium according to claim 27, wherein said program for electronic data management device for causing said electronic data management device to not execute said data deletion step when said electronic data management device located in a region range, permitted based on location information by a mobile communication base station or global navigation satellite system (GNSS); and said program for electronic data management device for causing said electronic data management device to execute said data deletion step when said electronic data management device locates outside said region range.

29. The non-transitory computer-readable recording medium according to claim 27, wherein said program for electronic data management device for causing said electronic data management device to execute said data deletion step when said electronic data management device can not communicate with said authentication means.

30. The non-transitory computer-readable recording medium according to claim 27, wherein said program for electronic data management device for causing said electronic data management device to execute said data deletion step when time information, which said electronic data management device obtained from a time information means, is out of setting time.

* * * * *